US012759020B2

(12) United States Patent
Kang et al.

(10) Patent No.: US 12,759,020 B2
(45) Date of Patent: Oct. 13, 2026

(54) VIBRATION APPARATUS AND APPARATUS INCLUDING THE SAME

(71) Applicant: LG Display Co., Ltd., Seoul (KR)

(72) Inventors: MinGyu Kang, Paju-si (KR); Kyungyeol Ryu, Paju-si (KR); Sungwook Ko, Paju-si (KR); Dasol Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 820 days.

(21) Appl. No.: 18/139,812

(22) Filed: Apr. 26, 2023

(65) Prior Publication Data

US 2024/0165667 A1 May 23, 2024

(30) Foreign Application Priority Data

Nov. 21, 2022 (KR) ........................ 10-2022-0156340

(51) Int. Cl.
*B06B 1/06* (2006.01)
*B06B 1/02* (2006.01)

(52) U.S. Cl.
CPC ............ *B06B 1/064* (2013.01); *B06B 1/0207* (2013.01); *B06B 2201/55* (2013.01)

(58) Field of Classification Search
CPC ...... B06B 1/064; B06B 1/0207; H10N 30/87; H10N 30/872; H10N 30/874
USPC .................................................. 310/365, 366
See application file for complete search history.

(56) References Cited

U.S. PATENT DOCUMENTS

2009/0160293 A1 6/2009 Yokobori et al.
2021/0146402 A1 5/2021 Kishimoto et al.
2021/0304920 A1* 9/2021 Ko .......................... G06F 3/016

FOREIGN PATENT DOCUMENTS

EP 4087272 A1 11/2022

OTHER PUBLICATIONS

Office Action dated Oct. 13, 2025, issued in corresponding European Patent Application No. Application No. 23169452.2.
Extended European search report issued in corresponding EP Patent Application No. 23169452.2 dated Oct. 2, 2023.

* cited by examiner

*Primary Examiner* — Derek J Rosenau
(74) *Attorney, Agent, or Firm* — Morgan, Lewis & Bockius LLP

(57) ABSTRACT

A vibration apparatus may include a vibration generating part including at least one or more vibration parts. The vibration apparatus may further include a first cover member at a first surface of the vibration generating part, a second cover member at a second surface of the vibration generating part, and a signal cable including first and second signal lines connected to the at least one or more vibration parts. The second surface of the vibration generating part is different from the first surface of the vibration generating part. The first and second signal lines may be provided between the second cover member and the vibration generating part.

29 Claims, 13 Drawing Sheets

VIBRATION APPARATUS AND APPARATUS INCLUDING THE SAME

CROSS-REFERENCE TO RELATED APPLICATIONS

This application claims the benefit of and priority to Korean Patent Application No. 10-2022-0156340 filed on Nov. 21, 2022, the entirety of which is incorporated herein by reference for all purposes as if fully set forth herein.

BACKGROUND

1. Technical Field

The present disclosure relates to an apparatus and particularly to, for example, without limitation, a vibration apparatus and an apparatus including the same.

2. Discussion of the Related Art

Recently, the demands for slimmer and thinner electronic devices are increasing. In speakers applied to electronic devices, piezoelectric devices capable of being implemented with a thin thickness are attracting much attention instead of voice coils, based on the demands for slimmer and thinner devices.

Speakers or vibration apparatuses that include a piezoelectric device may be supplied with a driving power or a driving signal through a signal cable and may be driven or may vibrate.

Vibration apparatuses (or film actuators) may include a film which includes a line for applying a driving power to a piezoelectric device and a pad electrode. The vibration apparatuses need a process of patterning the line and the pad electrode on the film and a soldering process of electrically connecting the pad electrode with a signal cable.

However, due to the soldering process needed for various components in vibration apparatuses, a design and a manufacturing process may be complicated, the manufacturing cost may rise, and the thickness of a product may increase. Furthermore, due to a vibration characteristic of vibration apparatuses, the vibration apparatuses (or film actuators) may be detached from a signal cable in a situation where a connection is implemented using soldering and bonding.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

The inventors have performed extensive research and experiments for implementing a vibration apparatus where a manufacturing process and a structure of the vibration apparatus are simplified. The inventors have invented a vibration apparatus having a new structure and an apparatus including the vibration apparatus, in which a manufacturing process and a structure of the vibration apparatus are simplified, based on the extensive research and experiments.

One or more aspects of the present disclosure are directed to providing a vibration apparatus and an apparatus including the same, in which a structure thereof and a manufacturing process are simplified.

One or more aspects of the present disclosure are directed to providing a vibration apparatus and an apparatus including the same, which may enhance a sound pressure level characteristic of a sound.

Additional features, advantages, and aspects of the present disclosure are set forth in the present disclosure and will also be apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

To achieve these and other advantages and aspects of the present disclosure, as embodied and broadly described herein, in one or more aspects, a vibration apparatus may comprise a vibration generating part including at least one or more vibration parts, a first cover member at a first surface of the vibration generating part, a second cover member at a second surface of the vibration generating part, the second surface of the vibration generating part being different from the first surface of the vibration generating part, and a signal cable including first and second signal lines connected to the at least one or more vibration parts. The first and second signal lines may be provided between the second cover member and the vibration generating part.

In one or more aspects, an apparatus may comprise a passive vibration member and a vibration generating apparatus connected to the passive vibration member and configured to vibrate the passive vibration member. The vibration apparatus may include a vibration generating part including at least one or more vibration parts, a first cover member at a first surface of the vibration generating part, a second cover member at a second surface of the vibration generating part, the second surface of the vibration generating part being different from the first surface of the vibration generating part, and a signal cable including first and second signal lines connected to the at least one or more vibration parts. The first and second signal lines may be provided between the second cover member and the vibration generating part.

According to one or more embodiments of the present disclosure, a vibration apparatus capable of simplifying a structure and a manufacturing process and an apparatus including the same may be provided.

According to one or more embodiments of the present disclosure, it is possible to provide a vibration apparatus capable of minimizing deterioration in acoustic characteristics even when an electrode having a high specific resistance is used, and an apparatus including the same.

According to one or more embodiments of the present disclosure, since the thickness of the vibration apparatus can be reduced to reduce the weight, it is possible to implement a lightweight vibration apparatus.

According to one or more embodiments of the present disclosure, yield may be improved by preventing defects such as cracks in the vibration apparatus, and thus process optimization may be realized through energy reduction in manufacturing.

According to one or more embodiments of the present disclosure, process optimization through energy reduction in manufacturing can be realized through simplification of the manufacturing process.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with one or more embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure.

Figure 1:
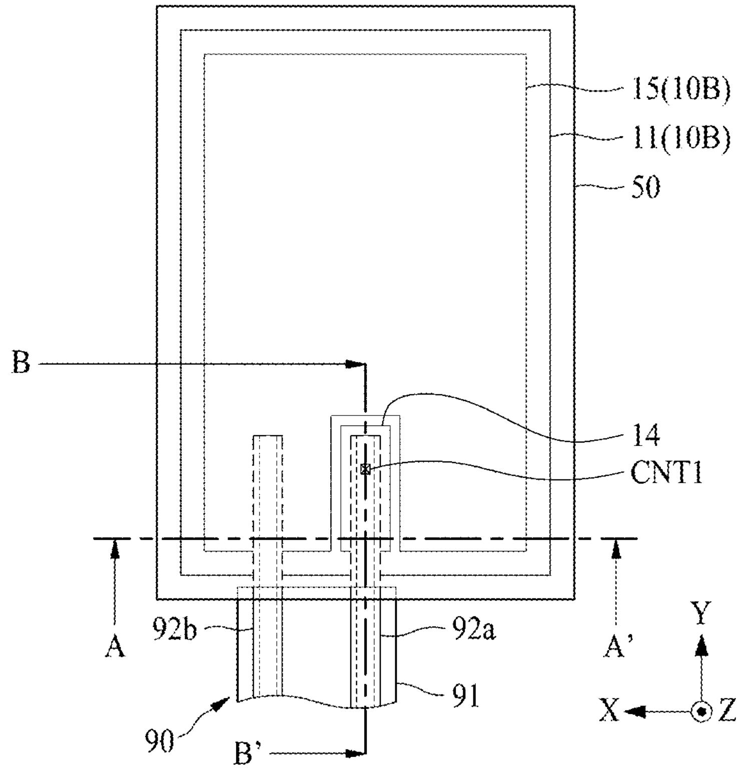
FIG. 1 illustrates a vibration apparatus according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

The shapes, sizes, areas, ratios, angles, numbers, and the like disclosed in the drawings for describing embodiments of the present disclosure are merely examples, and thus, the present disclosure is not limited to the illustrated details.

When the term "comprise," "have," "include," "contain," "constitute," "make up of," "formed of," or the like is used, one or more other elements may be added unless a term such as "only" or the like is used. The terms used in the present disclosure are merely used in order to describe particular embodiments, and are not intended to limit the scope of the present disclosure. The to ins used herein are merely used in order to describe example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term "may" encompasses all the meanings of the term "can."

In describing a positional relationship, where the positional relationship between two parts is described, for example, using "on," "over," "under," "above," "below," "beneath," "near," "close to," "adjacent to," "beside," "next to," or the like, one or more other parts may be located. between the two parts unless a more limiting term, such as "immediate(ly)," "direct(ly)," or "close(ly)," is used. For example, when a structure is described as being positioned "on," "over," "under," "above," "below," "beneath," "near," "close to," "adjacent to," "beside," or "next to" another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element or layer is "connected," "coupled," "attached," or "adhered" to another element or layer, the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

Figure 2:
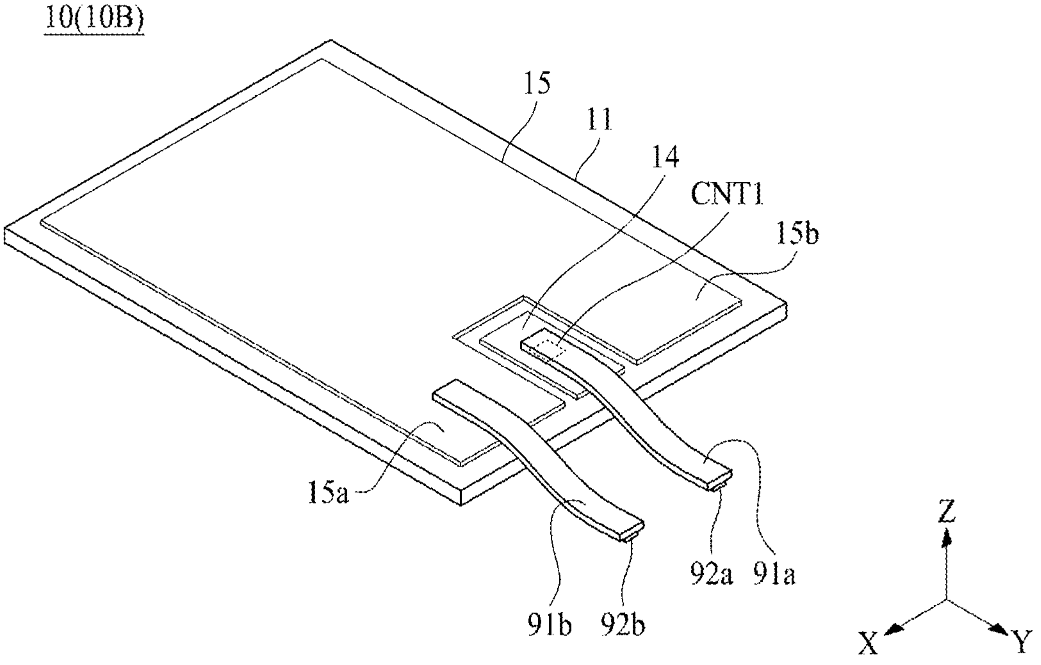
FIG. 2 is a perspective view illustrating a connection structure between a vibration generating part and a signal cable illustrated in FIG. 1 according to an example embodiment of the present disclosure.
Figure 3:
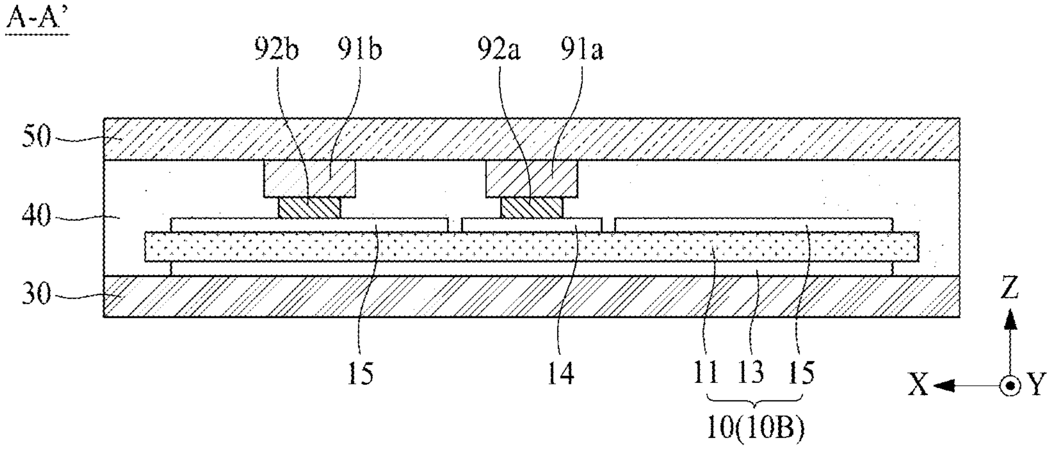
FIG. 3 is a cross-sectional view taken along line A-A' illustrated in FIG. 1 according to an example embodiment of the present disclosure.
Figure 4:
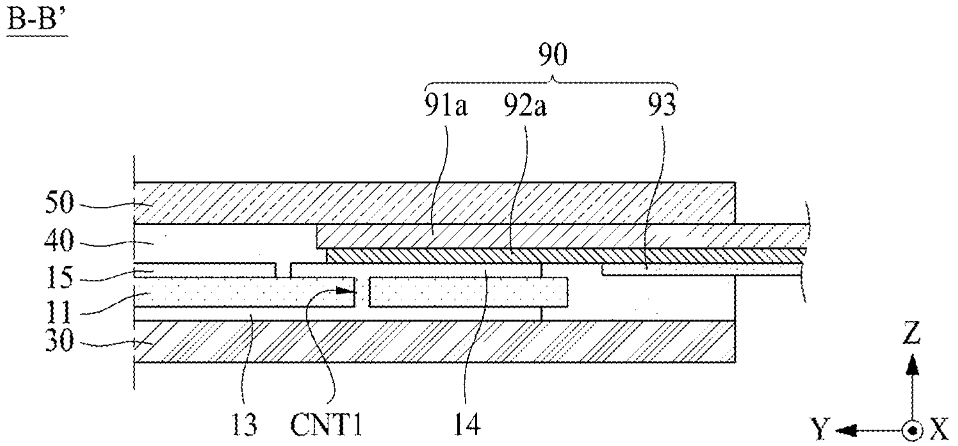
FIG. 4 is a cross-sectional view taken along line B-B' illustrated in FIG. 1 according to an example embodiment of the present disclosure.

FIG. 1 illustrates a vibration apparatus according to an example embodiment of the present disclosure. FIG. 2 is a perspective view illustrating a connection structure between a vibration generating part and a signal cable illustrated in FIG. 1 according to an example embodiment of the present disclosure. FIG. 3 is a cross-sectional view taken along line A-A' illustrated in FIG. 1 according to an example embodiment of the present disclosure. FIG. 4 is a cross-sectional view taken along line B-B' illustrated in FIG. 1 according to an example embodiment of the present disclosure.

Referring to FIGS. 1 to 4, a vibration apparatus according to an example embodiment of the present disclosure may include a vibration generating part 10, a first cover member 30, a second cover member 50, and a signal cable 90.

The vibration generating part 10 may include at least one or more vibration parts 10B. For example, the vibration generating part 10 according to an example embodiment of the present disclosure may have a single-layer structure and may include one vibration part 10B.

The vibration part 10B may include a piezoelectric device or a piezoelectric material (or an electroactive material) having a piezoelectric effect. For example, the piezoelectric material (or the piezoelectric device) may have a characteristic where pressure or twisting is applied to a crystal structure by an external force, a potential difference occurs due to dielectric polarization caused by a relative position change of a positive (+) ion and a negative (−) ion, and a vibration is generated by an electric field based on a voltage applied thereto.

The vibration part 10B may include a vibration layer 11, a first electrode layer 13, a second electrode layer 15, and an auxiliary electrode layer 14.

The vibration layer 11 may be provided between the first electrode layer 13 and the second electrode layer 15. The vibration layer 11 may be provided between the first electrode layer 13 and the auxiliary electrode layer 14. A first contact hole CNT1 overlapping the auxiliary electrode layer 14 may be provided at one end (or one side or one portion) of the vibration layer 11. The first contact hole CNT1 may overlap the auxiliary electrode layer 14 and the first electrode layer 13. The auxiliary electrode layer 14 may electrically contact the first electrode layer 13 through or by the first contact hole CNT1.

The vibration layer 11 may include a piezoelectric material (or an electroactive material) having a piezoelectric effect. The vibration layer 11 may include a ceramic-based material for implementing a relatively high vibration, or may include piezoelectric ceramic having a perovskite-based crystal structure.

The piezoelectric ceramic may include single-crystal ceramic having a single-crystal structure, or may include a ceramic material or poly-crystal ceramic having a poly-crystal structure. A piezoelectric material including single-crystal ceramic may include one or more of aluminum phosphate (for example, berlinite and $\alpha$-$AlPO_4$), silicon dioxide (for example, a-$SiO_2$), lithium niobate ($LiNbO_3$), terbium molydbate ($Tb_2(MoO_4)_3$), lithium tetraborate ($Li_2B_4O_7$), ZnO or a combination thereof. The piezoelectric material including single-crystal ceramic may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but embodiments of the present disclosure are not limited thereto. As another example, the vibration layer 11 may include at least one of $CaTiO_3$, $BaTiO_3$, and $SrTiO_3$ without lead (Pb), but embodiments of the present disclosure are not limited thereto.

The first electrode layer 13 may be disposed at a first surface (or a lower surface) of the vibration layer 11. The first electrode layer 13 may have the same size as that of the vibration layer 11, or may have a size which is less than that of the vibration layer 11. For example, the first electrode layer 13 may include a single-electrode shape. For example, the first electrode layer 13 may have a tetragonal shape. For example, an end (or a lateral surface or a side surface) of the first electrode layer 13 may be apart from an end (or a lateral surface or a side surface) of the vibration layer 11, and thus, an electrical connection (or short circuit) between the first electrode layer 13 and the second electrode layer 15 may be prevented.

The second electrode layer 15 may be disposed on a second surface (or an upper surface), which is opposite to or different from the first surface of the vibration layer 11. The second electrode layer 15 may have a size which is less than that of the vibration layer 11, but embodiments of the present disclosure are not limited thereto. In an example embodiment of the present disclosure, the second electrode layer 15 may include a plurality of protrusion portions (or a pair of protrusion portions) 15*a* and 15*b* which extend from one end (or one side or one portion) of the second electrode layer 15. The plurality of protrusion portions 15*a* and 15*b* may be spaced apart from each other and disposed in parallel.

Therefore, the second electrode layer 15 may not be provided in or at a region where the plurality of protrusion portions 15*a* and 15*b* are spaced apart from each other, and the second surface (or the upper surface) of the vibration layer 11 may be exposed. In another example embodiment of the present disclosure, the second electrode layer 15 may include a concave portion which is concave from a portion of the one end (or the one side or one portion) thereof. The concave portion may be formed to be concave along a second direction Y from a center portion of the one end (or the one side or one portion) of the second electrode layer 15. For example, the concave portion may be formed concavely to have a certain length along the second direction Y from the center portion of the one end (or the one side or one portion) of the second electrode layer 15. For example, the concave portion may be provided between the plurality of protrusion portions (or the pair of protrusion portions) 15*a* and 15*b*, but embodiments of the present disclosure are not limited thereto. For example, the concave portion may be a portion from which a portion of the second electrode layer 15 is removed or a portion where the second electrode layer 15 is not formed, and thus, may be a patterning portion, an electrode non-formation portion, an electrode non-disposition portion, or an open portion.

According to an example embodiment of the present disclosure, the second electrode layer 15 may include a single-electrode shape. For example, the second electrode layer 15 may have a single-electrode shape having a shape which differs from that of the first electrode layer 13. For example, the second electrode layer 15 may have a non-tetragonal shape. For example, an end (or a lateral surface or a side surface) of the second electrode layer 15 may be spaced apart from an end (or a lateral surface or a side surface) of the first electrode layer 13, and thus, an electrical connection (or short circuit) between the first electrode layer 13 and the second electrode layer 15 may be prevented.

A second signal line 92*b* may be provided at or on an upper surface of the second electrode layer 15. The second electrode layer 15 may contact the second signal line 92*b*. The second electrode layer 15 may be electrically connected to the second signal line 92*b*.

The auxiliary electrode layer 14 may be disposed at the second surface (or the upper surface), which is opposite to or different from the first surface of the vibration layer 11. The auxiliary electrode layer 14 may be provided at or on a same layer as the second electrode layer 15. For example, the auxiliary electrode layer 14 may be spaced apart from the second electrode layer 15. The auxiliary electrode layer 14 may be provided at the second surface of the vibration layer 11 exposed by the second electrode layer 15. For example, the auxiliary electrode layer 14 may be provided at the second surface of the vibration layer 11 exposed by the concave portion or the protrusion portions 15*a* and 15*b* of the second electrode layer 15. The auxiliary electrode layer 14 may be provided in or at a region, where the second electrode layer 15 is not provided, at the second surface of the vibration layer 11. The auxiliary electrode layer 14 may not overlap the second electrode layer 15. The auxiliary electrode layer 14 may not contact the second electrode layer 15. The auxiliary electrode layer 14 may include the same material as that of the second electrode layer 15 and may be formed by the same process. Accordingly, in an example embodiment of the present disclosure, the auxiliary electrode layer 14 may be provided without adding a process.

The auxiliary electrode layer 14 may be connected to the first electrode layer 13 through or by the first contact hole CNT1 provided in or at the vibration layer 11. The first contact hole CNT1 may be formed to pass through (or vertically pass through) a portion of the vibration layer 11 overlapping the auxiliary electrode layer 14 in a third direction Z parallel to a thickness direction of the vibration layer 11. For example, the auxiliary electrode layer 14 may be filled into or in the first contact hole CNT1, and thus, may be connected to the first electrode layer 13. For example, the auxiliary electrode layer 14 and the first electrode layer 13 may be connected to each other in or at the first contact hole CNT1. The first signal line 92*a* may be provided at or on an upper surface of the auxiliary electrode layer 14. The auxiliary electrode layer 14 may contact the first signal line 92*a*. For example, the first electrode layer 13 may be electrically connected to the first signal line 92*a* through or by the auxiliary electrode layer 14.

According to an example embodiment of the present disclosure, the first signal line 92*a* may be connected to the first electrode layer 13 through or by the auxiliary electrode layer 14 and the first contact hole CNT1, and the second signal line 92*b* may be connected to the second electrode layer 15 at the second surface (or the upper surface) of the vibration layer 11. According to an example embodiment of the present disclosure, the first signal line 92*a* and the second signal line 92*b* may be provided between the vibration generating part 10 and the second cover member 50, and thus, a step height occurring in connecting signal lines may be reduced, thereby preventing the occurrence of damage such as a crack caused by a step height in a vibration apparatus.

One or more of the first electrode layer 13 and the second electrode layer 15 according to an example embodiment of the present disclosure may include a transparent conductive material, a semitransparent conductive material, or an opaque conductive material. For example, the transparent or semitransparent conductive material may include one or more of indium tin oxide (ITO) or indium zinc oxide (IZO), but embodiments of the present disclosure are not limited thereto. The opaque conductive material may include one or more of gold (Au), silver (Ag), platinum (Pt), palladium (Pd), molybdenum (Mo), magnesium (Mg), carbon, or glass frit-including silver (Ag), or an alloy thereof, but embodiments of the present disclosure are not limited thereto. According to another example embodiment of the present disclosure, each of the first electrode layer 13 and the second electrode layer 15 may include silver (Ag) having a low resistivity, so as to enhance an electrical characteristic and/or a vibration characteristic of the vibration layer 11. For example, carbon may be a carbon material including carbon black, ketjen black, carbon nanotube, and graphite.

In the first electrode layer 13 and the second electrode layer 15 including glass frit-including silver (Ag), a content of glass frit may be about 1 wt % or more to about 12 wt % or less, but embodiments of the present disclosure are not limited thereto. The glass frit may include a material based on PbO or $Bi_2O_3$, but embodiments of the present disclosure are not limited thereto.

The vibration layer 11 may be polarized (or poling) by a certain voltage applied to the first electrode layer 13 and the second electrode layer 15 in a certain temperature atmosphere or a temperature atmosphere which is changed from a high temperature to a room temperature, but embodiments of the present disclosure are not limited thereto. For example, the vibration layer 11 may alternately repeat contraction and/or expansion based on an inverse piezoelectric effect based on a sound signal (or a voice signal) applied to the first electrode layer 13 and the second electrode layer 15 from the outside, and thus, may vibrate. For example, the vibration layer 11 may vibrate based on a vertical-direction vibration and a horizontal-direction vibration by the first electrode layer 13 and the second electrode layer 15. A displacement (or vibration or driving) of a vibration member may increase based on the horizontal-direction contraction and/or expansion of the vibration layer, and thus, a vibration of a vibration apparatus may be further enhanced.

The first cover member 30 may be disposed at a first surface of the vibration generating part 10. For example, the first cover member 30 may be configured to cover a lower portion of the vibration generating part 10. For example, the first cover member 30 may be configured to cover the first electrode layer 13 of the vibration generating part 10. Accordingly, the first cover member 30 may be configured to cover the first surface of the vibration generating part 10.

The second cover member 50 may be disposed at a second surface of the vibration generating part 10. For example, the second cover member 50 may be configured to cover the auxiliary electrode layer 14 and the second electrode layer 15 of the vibration generating part 10. Accordingly, the second cover member 50 may protect the auxiliary electrode layer 14 and the second electrode layer 15 provided at the second surface of the vibration generating part 10.

Each of the first cover member 30 and the second cover member 50 according to an example embodiment of the present disclosure may include one or more materials of plastic, fiber, cloth, paper, leather, rubber, and wood, but embodiments of the present disclosure are not limited thereto. For example, the first cover member 30 and the second cover member 50 may include the same material or different materials. For example, each of the first cover member 30 and the second cover member 50 may be a polyimide film or a polyethylene terephthalate film, but embodiments of the present disclosure are not limited thereto.

According to another example embodiment of the present disclosure, one or more of the first cover member 30 and the second cover member 50 may include an adhesive member. For example, one or more of the first cover member 30 and the second cover member 50 may include an adhesive member coupled or adhered to the vibration layer 11, and a protection member (or a delamination member) which covers or protects the adhesive member. For example, the adhesive member may include an electrical insulation material which has adhesive properties and is capable of compression and decompression. For example, the first cover member 30 may include an adhesive member coupled or adhered to the vibration layer 11 and a protection member (or a delamination member) which covers or protects the adhesive member.

The first cover member 30 may be connected or coupled to at least a portion of the first electrode layer 13 or the first surface of the vibration generating part 10 by the adhesive layer 40. For example, the first cover member 30 may be connected or coupled to at least a portion of the first electrode layer 13 or the first surface of the vibration generating part 10 through a film laminating process using the adhesive layer 40.

The second cover member 50 may be connected or coupled to at least a portion of the second electrode layer 15 or the second surface of the vibration generating part 10 by the adhesive layer 40. For example, the second cover member 50 may be connected or coupled to at least a portion of the second electrode layer 15 or the second surface of the vibration generating part 10 through a film laminating process using the adhesive layer 40.

The adhesive layer 40 according to an example embodiment of the present disclosure may include an electrical insulation material which has adhesive properties and is capable of compression and decompression. For example, the adhesive layer 40 may include epoxy resin, acrylic resin, silicone resin, and urethane resin, but embodiments of the present disclosure are not limited thereto.

The signal cable 90 may be implemented to be connected to the vibration generating part 10 at one side or a portion of the vibration generating part 10. The signal cable 90 may be connected to the vibration generating part 10, between the first cover member 30 and the second cover member 50.

An end portion (or a distal end portion) of the signal cable 90 may be disposed at or inserted (or accommodated) into a portion between one periphery portion of the first cover member 30 and one periphery portion of the second cover member 50. The one periphery portion of the first cover member 30 and the one periphery portion of the second cover member 50 may accommodate or vertically cover a portion of the signal cable 90. Accordingly, the signal cable 90 may be provided as one body with the vibration generating part 10. For example, the vibration apparatus according to an example embodiment of the present disclosure may be a vibration apparatus which is provided as one body with the signal cable 90. For example, the signal cable 90 may be configured as a flexible cable, a flexible printed circuit cable, a flexible flat cable, a single-sided flexible printed circuit, a single-sided flexible printed circuit board (PCB), a flexible multilayer printed circuit, or a flexible multilayer PCB, but embodiments of the present disclosure are not limited thereto.

The signal cable 90 according to an example embodiment of the present disclosure may include a base member 91 and a plurality of signal lines 92*a* and 92*b*. For example, the signal cable 90 may include a base member 91, a first signal line 92*a*, and a second signal line 92*b*.

The base member 91 may include a transparent or an opaque plastic material. For example, the base member 91 may include one or more of synthetic resins such as fluorine resin, polyimide-based resin, polyurethane-based resin, polyester-based resin, polyethylene-based resin, and polypropylene-based resin, but embodiments of the present disclosure are not limited thereto. The base member 91 may be a base film or a base insulation film, but embodiments of the present disclosure are not limited thereto.

The base member 91 may have a certain width in a first direction X and may extend lengthwise along the second direction Y intersecting with the first direction X.

Each of the first and second signal lines 92*a* and 92*b* may be disposed at or on a first surface of the base member 91 in parallel with the second direction Y, and may be spaced apart from or separated from each other along the first direction X. Each of the first and second signal lines 92*a* and 92*b* may be arranged in parallel at or on the first surface of the base member 91. For example, each of the first and second signal lines 92*a* and 92*b* may be implemented in a line shape by patterning of a metal layer (or a conductive layer) which is formed or deposited at or on the first surface of the base member 91.

End portions (or distal end portions) of each of the first and second signal lines 92*a* and 92*b* may be separated from each other, and thus, may be individually bent or curved.

The end portion (or the distal end portion) of the first signal line 92*a* may be electrically connected to the auxiliary electrode layer 14. The auxiliary electrode layer 14 according to an example embodiment of the present disclosure may be electrically connected to the first electrode layer 13 close to the first cover member 30 through or by the first contact hole CNT1 formed in the vibration layer 11. Therefore, the first signal line 92*a* may be electrically connected to the first electrode layer 13 through or by the auxiliary electrode layer 14. Accordingly, the first signal line 92*a* may supply a driving signal, supplied from a vibration driving circuit, to the first electrode layer 13 of the vibration generating part 10. For example, the driving signal may be an alternating current (AC) signal.

The end portion of the second signal line 92*b* may be electrically connected to at least a portion of the second electrode layer 15 of the vibration generating part 10 at the one periphery portion EP of the second cover member 50. For example, the end portion of the second signal line 92*b* may be electrically connected to at least a portion of the second electrode layer 15 of the vibration generating part 10. For example, the end portion of the second signal line 92*b* may be directly connected to or directly contact the second electrode layer 15 of the vibration generating part 10. Accordingly, the second signal line 92*b* may supply the driving signal, supplied from the vibration driving circuit, to the second electrode layer 15 of the vibration generating part 10. For example, the driving signal may be supplied to the first signal line 92*a* and the second signal line 92*b*.

In the vibration generating part 10, the first electrode layer 13 may receive the driving signal through or by the first signal line 92*a*, and the second electrode layer 15 may receive the driving signal through or by the second signal line 92*b*. Accordingly, the vibration part 10B may alternately repeat contraction and/or expansion based on an inverse piezoelectric effect which is generated in the vibration layer 11 based on the driving signal, and thus, may vibrate (or displace or drive).

The signal cable 90 according to an example embodiment of the present disclosure may further include an insulation member 93.

The insulation member 93 may be disposed at the first surface of the base member 91 to cover each of the first and second signal lines 92*a* and 92*b* other than the end portion of the signal cable 90. The insulation member 93 may be a protection layer, a coverlay, a coverlay layer, a cover film, an insulation film, or a solder mask, but embodiments of the present disclosure are not limited thereto.

The signal cable 90 or the base member 91 may include a first extension portion 91*a* which supports an end portion of the first signal line 92*a*. The first extension portion 91*a* may extend in the second direction Y from an end of the insulation member 93 covering the first signal line 92*a* disposed at the base member 91, and thus, may support the first signal line 92*a*. The first signal line 92*a* may be disposed at a lower surface (or a bottom surface) of the first extension portion 91*a* so as to be directly connected to the vibration generating part 10.

The signal cable 90 or the base member 91 may include a second extension portion 91*b* which individually supports an end portion of the second signal line 92*b*. The second extension portion 91*b* may extend in the second direction Y from an end of the base member 91, and thus, may support the second signal line 92*b*. The second signal line 92*b* may be disposed at a lower surface (or a bottom surface) of the second extension portion 91*b* so as to be directly connected to the vibration part 10B.

The signal cable 90 may include the first and second extension portions 91*a* and 91*b* which respectively support the end portions of each of the first and second signal lines 92*a* and 92*b* separated from each other. For example, the first and second extension portions 91*a* and 91*b* may be separated from each other between the one periphery portion of the first cover member 30 and the one periphery portion of the second cover member 50. Accordingly, the end portions (or distal end portions) of the first and second signal lines 92*a* and 92*b* may be separated from each other, and thus, may be individually bent or curved.

According to another example embodiment of the present disclosure, each of the first and second extension portions 91*a* and 91*b* of the signal cable 90 may be omitted. For example, the first and second signal lines 92*a* and 92*b* may protrude or extend in a finger shape from the base member 91 of each of the first and second signal lines 92*a* and 92*b*, and may be electrically connected to or contact corresponding electrode layers 13 and 15 between the one periphery portion of the first cover member 30 and the one periphery portion of the second cover member 50, respectively. For example, the end portions of each of the first and second signal lines 92*a* and 92*b* may be electrically connected to or contact the corresponding electrode layers 13 and 15 by a double-sided tape, and thus, an adhesive force to the corresponding electrode layers 13 and 15 may be secured.

The end portion (or the distal end portion) of the signal cable 90 inserted (or accommodated) between the first cover member 30 and the second cover member 50 may be inserted (or accommodated) and fixed between the first cover member 30 and the second cover member 50 through a film laminating process which uses a first adhesive layer 41 formed in the first cover member 30 and a second adhesive layer 42 formed in the second cover member 50. Therefore, the first signal line 92*a* may be maintained with being electrically connected to the first electrode layer 13 of the vibration part 10B through or by the auxiliary electrode layer 14, and the second signal line 92*b* may be maintained with being electrically connected to the second electrode layer 15 of the vibration part 10B. Furthermore, the end portion (or the distal end portion) of the signal cable 90 may be inserted (or accommodated) and fixed between the first cover member 30 and the second cover member 50, and thus, a connection defect between the vibration generating part 10 and the signal cable 90 caused by movement of the signal cable 90 may be prevented.

In the vibration apparatus according to an example embodiment of the present disclosure, the first and second signal lines 92*a* and 92*b* of the signal cable 90 may be connected to the electrode layer of the vibration generating part 10 between the first cover member 30 and the second cover member 50, and thus, a soldering process for an electrical connection between the vibration generating part 10 and the signal cable 90 may not be needed, thereby simplifying a structure and a manufacturing process.

Moreover, in the vibration apparatus according to an example embodiment of the present disclosure, all of the first and second signal lines 92*a* and 92*b* of the signal cable 90 may be provided between the second cover member 50 and the vibration generating part 10, and thus, a thickness of the vibration apparatus may be reduced. Furthermore, according to an example embodiment of the present disclosure, all of the first and second signal lines 92*a* and 92*b* may be provided at the second surface (or an upper surface) of the vibration generating part 10, and thus, in a case where a signal line is provided at a center or a lower surface of the vibration generating part 10, the occurrence of a defect such as a crack may be prevented.

Moreover, according to an example embodiment of the present disclosure, a thickness of a vibration apparatus may decrease, and thus, a weight may be reduced, thereby implementing a vibration apparatus which is lightweight. In addition, according to an example embodiment of the present disclosure, a defect such as a crack of a vibration apparatus may be prevented, and thus, a yield ratio may be enhanced, thereby implementing process optimization by reducing production energy. Furthermore, according to an example embodiment of the present disclosure, a manufacturing process may be simplified, and thus, process optimization may be realized by reducing production energy.

Figure 5:
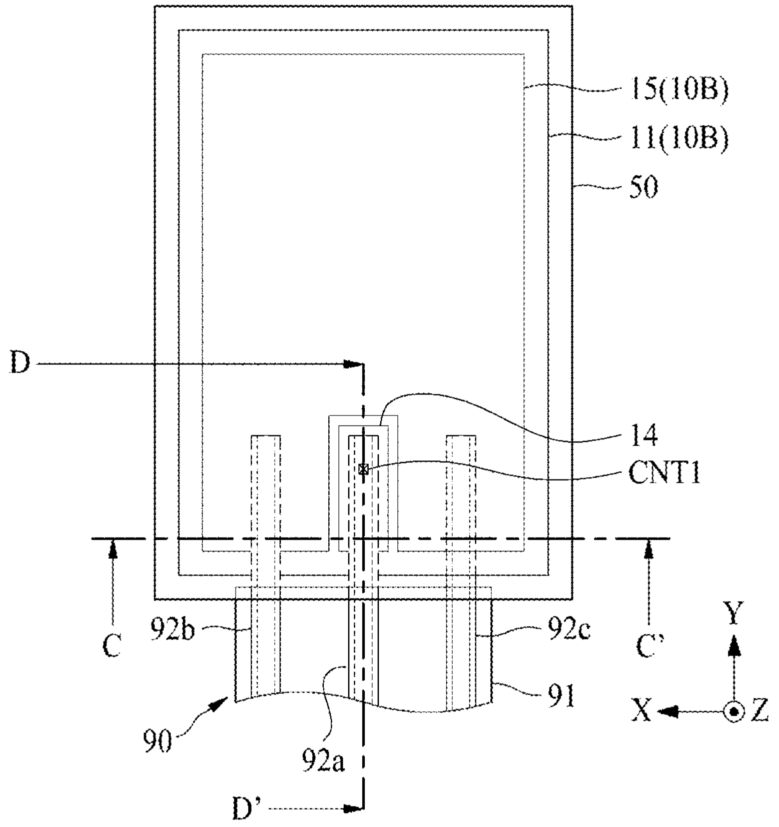
FIG. 5 illustrates a vibration apparatus according to another example embodiment of the present disclosure.
Figure 6:
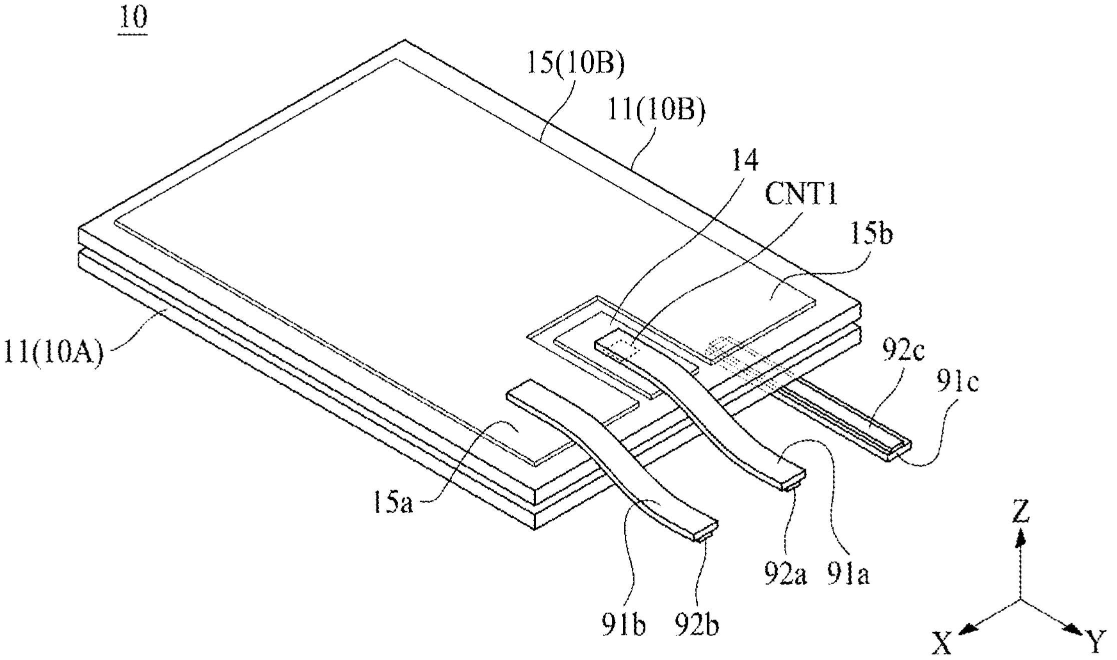
FIG. 6 is a perspective view illustrating a connection structure between a vibration generating part and a signal cable illustrated in FIG. 5 according to another example embodiment of the present disclosure.
Figure 7:
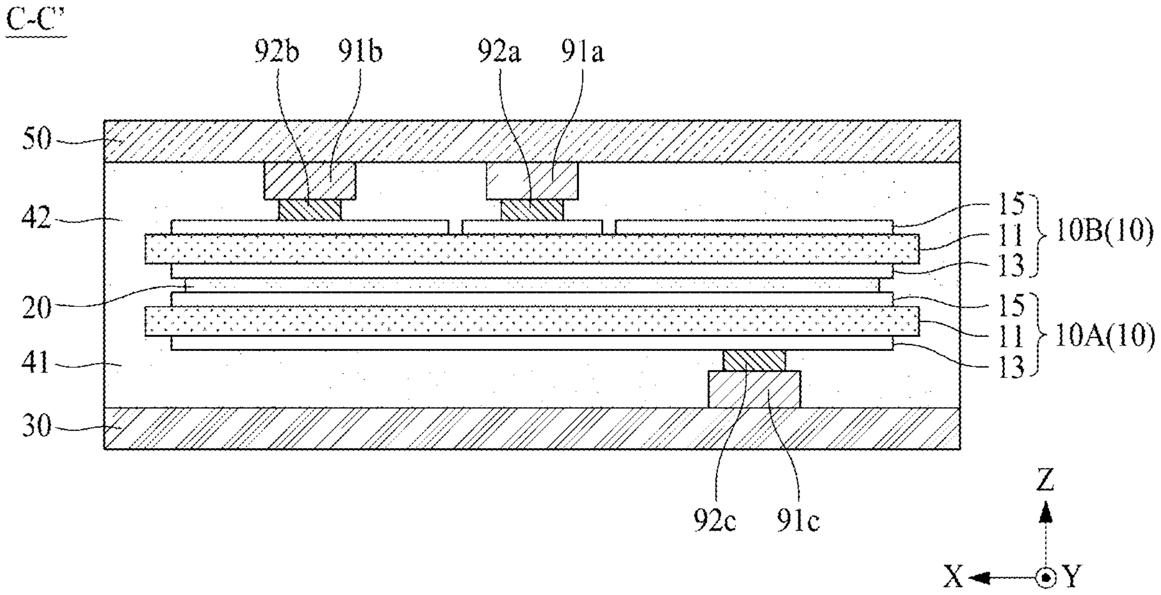
FIG. 7 is a cross-sectional view taken along line C-C' illustrated in FIG. 5 according to another example embodiment of the present disclosure.
Figure 8:
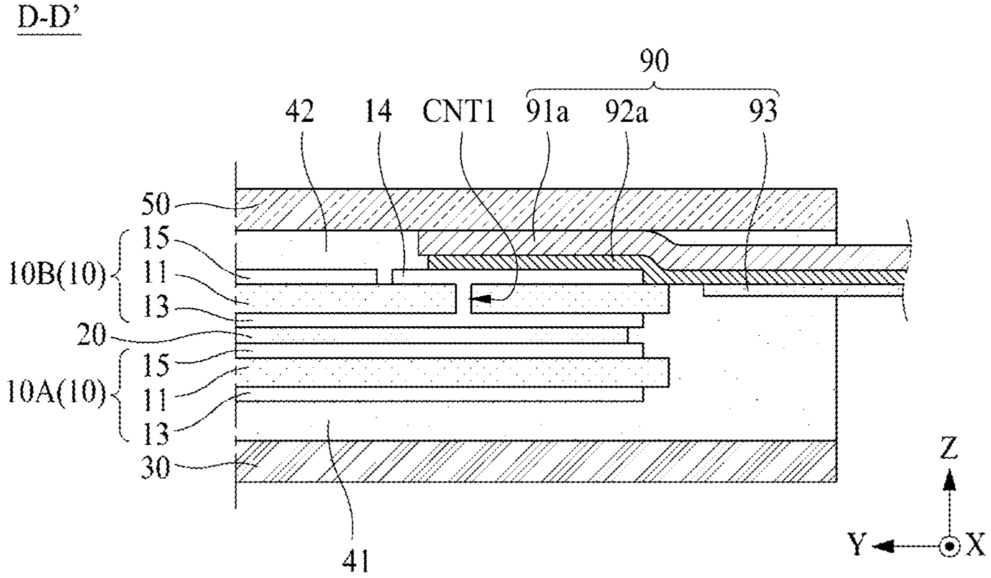
FIG. 8 is a cross-sectional view taken along line D-D' illustrated in FIG. 5 according to another example embodiment of the present disclosure.

FIG. 5 illustrates a vibration apparatus according to another example embodiment of the present disclosure. FIG. 6 is a perspective view illustrating a connection structure between a vibration generating part and a signal cable illustrated in FIG. 5 according to another example embodiment of the present disclosure. FIG. 7 is a cross-sectional view taken along line C-C' illustrated in FIG. 5 according to another example embodiment of the present disclosure. FIG. 8 is a cross-sectional view taken along line D-D' illustrated in FIG. 5 according to another example embodiment of the present disclosure. A vibration apparatus according to another example embodiment of the present disclosure described above with reference to FIGS. 5 to 8 may include a plurality of vibration parts and a first connection member, and the other elements may be substantially the same as those of the vibration apparatus according to an example embodiment of the present disclosure described above with reference to FIGS. 1 to 4. Therefore, in describing FIGS. 5 to 8, elements other than a plurality of vibration parts, a first connection member, and elements relevant thereto may be referred to by like reference numerals, and repetitive descriptions thereof may be omitted.

Referring to FIGS. 5 to 8, a vibration generating part 10 according to another example embodiment of the present disclosure may include a plurality of vibration parts 10A and 10B. For example, the vibration generating part 10 may include the plurality of vibration parts 10A and 10B which overlap or overlay each other. For example, the vibration generating part 10 may include the plurality of vibration parts 10A and 10B which are stacked or overlay. For example, the vibration generating part 10 may include a first vibration part 10A and a second vibration part 10B stacked on the first vibration part 10A.

The plurality of vibration parts 10A and 10B or the first and second vibration parts 10A and 10B may be connected to or contact each other. For example, the plurality of vibration parts 10A and 10B or the first and second vibration parts 10A and 10B may contact each other by a first connection member 20. However, embodiments of the present disclosure are not limited thereto, and the plurality of vibration parts 10A and 10B or the first and second vibration parts 10A and 10B may be connected to or contact each other without an intermediate medium such as a connection member or a contact member. For convenience of description, in describing FIGS. 5 to 8, an example where the vibration generating part 10 includes the first and second vibration parts 10A and 10B is described. Furthermore, for convenience of description, in describing FIGS. 5 to 8, an example where the vibration generating part 10 includes the first connection member 20 is described.

Each of the first and second vibration parts 10A and 10B may include a piezoelectric device or a piezoelectric material (or an electroactive material) having a piezoelectric effect. Each of the first and second vibration parts 10A and 10B may include a vibration layer 11, a first electrode layer 13, and a second electrode layer 15.

According to an example embodiment of the present disclosure, the vibration layers 11 of the first and second vibration parts 10A and 10B may have the same ceramic crystal structure or different ceramic crystal structures. For example, each of the vibration layer 11 of the first vibration part 10A and the vibration layer 11 of the second vibration part 10B may include single-crystal ceramic or poly-crystal ceramic. For example, one of the vibration layer 11 of the first vibration part 10A and the vibration layer 11 of the second vibration part 10B may include single-crystal ceramic, and the other may include poly-crystal ceramic.

In a stack structure of the first and second vibration parts 10A and 10B, each of the first electrode layer 13 and the second electrode layer 15 may be formed at the other portion except a periphery (or an edge) portion of the vibration layer 11, so as to prevent electrical short circuit between electrode layers vertically adjacent to each other. For example, a distance between a lateral surface (or a side surface) of the vibration layer 11 and a lateral surface (or a side surface) of each of the first electrode layer 13 and the second electrode layer 15 may be at least 0.5 mm or more, but embodiments of the present disclosure are not limited thereto. For example, the distance between the lateral surface (or the side surface) of the vibration layer 11 and the lateral surface (or the side surface) of each of the first electrode layer 13 and the second electrode layer 15 may be at least 1 mm or more, but embodiments of the present disclosure are not limited thereto.

According to an example embodiment of the present disclosure, the second electrode layer 15 of the first vibration part 10A may be electrically connected to or contact the first electrode layer 13 of the second vibration part 10B. For example, the second electrode layer 15 of the first vibration part 10A may be electrically connected to or contact the first electrode layer 13 of the second vibration part 10B by the first connection member 20. For example, the first connection member 20 may include a conductive material. For example, the conductive material may include one or more of a copper (Cu) or silver (Ag) material, but embodiments of the present disclosure are not limited thereto. For example, the first connection member 20 may include a conductive double-sided adhesive member. For example, the first connection member 20 may include a conductive double-sided tape, a conductive double-sided adhesive pad, or a conductive double-sided cushion tape, but embodiments of the present disclosure are not limited thereto. The first connection member 20 according to an example embodiment of the present disclosure may include a metal layer, a first tacky layer (or a first adhesive layer) which is coupled to a first surface of the metal layer and is electrically connected to or contacts the second electrode layer 15 of the first vibration part 10A, and a second tacky layer (or a second adhesive layer) which is coupled to a second surface of the metal layer and is electrically connected to or contacts the first electrode layer 13 of the second vibration part 10B. According to an example embodiment of the present disclosure, the metal layer may include one or more of a copper (Cu) or silver (Ag) material, but embodiments of the present disclosure are not limited thereto. Each of the first and second tacky layers (or the first and second adhesive layers) may include or contain a conductive material. For example, the first connection member 20 may be an interlayer connection member, an internal connection member, or an electrode connection member, but embodiments of the present disclosure are not limited thereto.

The second vibration part 10B may include an auxiliary electrode layer 14. The auxiliary electrode layer 14 may be disposed at a second surface (or an upper surface), which is opposite to or different from a first surface of the vibration layer 11 provided in or at the second vibration part 10B. In the second vibration part 10B, the auxiliary electrode layer 14 may be provided at an upper surface of the vibration layer 11 where the second electrode layer 15 is not provided.

In the second vibration part 10B, the auxiliary electrode layer 14 may be connected to the first electrode layer 13 of the second vibration part 10B through or by the first contact hole CNT1 provided in or at the vibration layer 11 of the second vibration part 10B. The first electrode layer 13 of the second vibration part 10B may be connected to the second electrode layer 15 of the first vibration part 10A through or by the first connection member 20. For example, the auxiliary electrode layer 14, the first electrode layer 13 of the second vibration part 10B, the first connection member 20, and the second electrode layer 15 of the first vibration part 10A may be sequentially connected to one another.

The auxiliary electrode layer 14 may contact the first signal line 92*a*. Therefore, the first electrode layer 13 of the second vibration part 10B, the first connection member 20, and the second electrode layer 15 of the first vibration part 10A may be sequentially connected to the first signal line 92*a* through or by the auxiliary electrode layer 14. Accordingly, the second electrode layer 15 of the first vibration part 10A and the first electrode layer 13 of the second vibration part 10B may be a middle electrode layer, an internal electrode layer, a common electrode layer, and a third electrode layer of the vibration generating part 10, but embodiments of the present disclosure are not limited thereto.

The vibration layer 11 of the first vibration part 10A and the vibration layer 11 of the second vibration part 10B may be polarized (or poling) in the same direction, or may be polarized (or poling) in directions opposite to each other. For example, a polarization direction (or a poling direction) formed in the vibration layer 11 of the first vibration part 10A may be a direction opposite to a polarization direction (or a poling direction) formed in the vibration layer 11 of the second vibration part 10B. According to an example embodiment of the present disclosure, the second electrode layer 15 of the first vibration part 10A may be connected to the first electrode layer 13 of the second vibration part 10B, and thus, when the polarization direction (or the poling direction) formed in the vibration layer 11 of the first vibration part 10A is a direction opposite to the polarization direction (or the poling direction) formed in the vibration layer 11 of the second vibration part 10B, the first vibration part 10A and the second vibration part 10B may be displaced (or vibrated or driven) in the same direction, and thus, a vibration width (or a displacement width or a driving width) of the vibration generating part 10 may be maximized, thereby enhancing a sound pressure level.

The first cover member 30 may be configured to cover the first vibration part 10A of the vibration generating part 10. For example, the first cover member 30 may be configured to cover the first electrode layer 13 of the first vibration part 10A. Accordingly, the first cover member 30 may protect the first surface of the vibration generating part 10 and the first electrode layer 13 of the first vibration part 10A.

The second cover member 50 may be configured to cover the second vibration part 10B of the vibration generating part 10. For example, the second cover member 50 may be configured to cover the auxiliary electrode layer 14 and the second electrode layer 15 of the second vibration part 10B. Accordingly, the second cover member 50 may protect the second surface of the vibration generating part 10 and the auxiliary electrode layer 14 and the second electrode layer 15 of the second vibration part 10B.

The first cover member 30 may be connected or coupled to at least a portion of the first electrode layer 13 of the first vibration part 10A or the first surface of the vibration generating part 10 by the first adhesive layer 41. For example, the first cover member 30 may be connected or coupled to at least a portion of the first electrode layer 13 of the first vibration part 10A or the first surface of the vibration generating part 10 through a film laminating process using the first adhesive layer 41.

The second cover member 50 may be connected or coupled to at least a portion of the second electrode layer 15 of the second vibration part 10B or the second surface of the vibration generating part 10 by the second adhesive layer 42. For example, the second cover member 50 may be connected or coupled to at least a portion of the second electrode layer 15 of the second vibration part 10B or the second surface of the vibration generating part 10 through a film laminating process using the second adhesive layer 42.

The signal cable 90 may be implemented to be connected to each of the first and second vibration parts 10A and 10B of the vibration generating part 10 at a portion (or one side) of the vibration generating part 10. The signal cable 90 may be connected to each of the first and second vibration parts 10A and 10B, between the first cover member 30 and the second cover member 50.

According to another example embodiment of the present disclosure, the signal cable 90 may include a base member 91 and a plurality of signal lines 92*a* to 92*c*. The signal cable 90 may include the base member 91, a first signal line 92*a*, a second signal line 92*b*, and a third signal line 92*c*.

The first signal line 92*a* according to another example embodiment of the present disclosure may be connected to the second vibration part 10B. The first signal line 92*a* may be electrically connected to the first electrode layer 13 of the second vibration part 10B through or by the auxiliary electrode layer 14. The first electrode layer 13 of the second vibration part 10B may be electrically connected to the second electrode layer 15 of the first vibration part 10A. Accordingly, the first signal line 92*a* may supply the driving signal supplied from the vibration driving circuit, to the first electrode layer 13 of the second vibration part 10B and the second electrode layer 15 of the first vibration part 10A.

An end portion of the second signal line 92*b* may be electrically connected to at least a portion of the second electrode layer 15 of the second vibration part 10B.

An end portion (or a distal end portion) of the third signal line 92*c* may be electrically connected to an electrode layer, which is close to the first cover member 30, of the first and second electrode layers 13 and 15 of the first vibration part 10A. For example, the end portion of the third signal line 92*c* may be electrically connected to at least a portion of the first electrode layer 13 of the first vibration part 10A at a periphery portion or one edge portion of the first cover member 30. For example, the end portion of the third signal line 92*c* may be electrically connected to at least a portion of the first electrode layer 13 of the first vibration part 10A. Therefore, the third signal line 92*c* may supply the driving signal, supplied from the vibration driving circuit, to the first electrode layer 13 of the first vibration part 10A. For example, when the first signal line 92*a* is a common electrode, signals supplied to the second signal line 92*b* and the third signal line 92*c* may be applied with the same phase. Accordingly, the contraction and/or expansion of the first vibration part 10A and the second vibration part 10B may be performed with the same phase.

In the first vibration part 10A, the first electrode layer 13 may receive the driving signal through or by the third signal line 92*c*, and the second electrode layer 15 may receive the driving signal through or by the first signal line 92*a*. Accordingly, the first vibration part 10A may alternately repeat contraction and/or expansion based on an inverse piezoelectric effect which is generated in the vibration layer 11 based on the driving signal, and thus, may vibrate (or displace or drive).

In the second vibration part 10B, the first electrode layer 13 may receive the driving signal through the first signal line 92*a*, and the second electrode layer 15 may receive the driving signal through or by the second signal line 92*b*. Accordingly, the second vibration part 10B may alternately repeat contraction and/or expansion based on an inverse piezoelectric effect which is generated in the vibration layer 11 based on the driving signal, and thus, may vibrate (or displace or drive).

Each of the first vibration part 10A and the second vibration part 10B may be flexed (or displaced or driven) in the same shape. Therefore, in the vibration generating part 10 or the vibration apparatus, a vibration width (or a displacement width or a driving width) of the first vibration part 10A and a vibration width (or a displacement width or a driving width) of the second vibration part 10B may be summated and maximized. For example, in the vibration generating part 10 or the vibration apparatus, a vibration of the first vibration part 10A and a vibration of the second vibration part 10B may be reinforced, and thus, vibration efficiency or vibration characteristic may be enhanced and a vibration width (or a displacement width or a driving width) of the second vibration part 10B may be maximized, whereby a sound characteristic and/or a sound pressure level characteristic of a low-pitched sound band may be enhanced.

The signal cable 90 or the base member 91 according to an example embodiment of the present disclosure may include a third extension portion 91*c* which individually supports an end portion of the third signal line 92*c*. The third extension portion 91*c* may extend in the second direction Y from an end of the base member 91, and thus, may support the third signal line 92*c*. The third signal line 92*c* may be disposed at an upper surface (or a top surface) of the third extension portion 91*c* so as to be directly connected to the first vibration part 10A.

The signal cable 90 may include the first to third extension portions 91*a* to 91*c* which respectively support the end portions of the first to third signal lines 92*a* to 92*c* separated from one another. For example, the first to third extension portions 91*a* to 91*c* may be separated from one another between the one periphery portion (or the one edge portion) of the first cover member 30 and one periphery portion (or one edge portion of the second cover member 50. Accordingly, the end portions (or distal end portions) of the first to third signal lines 92*a* to 92*c* may be separated from one another, and thus, may be individually bent or curved.

In the vibration apparatus according to another example embodiment of the present disclosure, the first to third signal lines 92*a*, 92*b*, and 92*c* of the signal cable 90 may be connected to the electrode layer of the vibration generating part 10 between the first cover member 30 and the second cover member 50, and thus, a soldering process for an electrical connection between the vibration generating part 10 and the signal cable 90 may not be needed, thereby simplifying a structure and a manufacturing process. Furthermore, the vibration apparatus according to another example embodiment of the present disclosure may include the plurality of vibration parts 10A and 10B which overlap or overlay each other to vibrate (or displace or drive) in the same direction, and thus, vibration efficiency or vibration characteristic may be enhanced and a vibration width (or a displacement width or a driving width) may be maximized, thereby enhancing a sound characteristic and/or a sound pressure level characteristic of a low-pitched sound band.

Moreover, in the vibration apparatus according to another example embodiment of the present disclosure, all of the first and second signal lines 92*a* and 92*b* of the signal cable 90 may be provided between the second cover member 50 and the vibration generating part 10. Therefore, in the vibration apparatus according to another example embodiment of the present disclosure, the first signal line 92*a* may not be provided between the plurality of vibration parts 10A and 10B, and thus, a thickness and a step height of the vibration apparatus may decrease. Furthermore, in the vibration apparatus according to another example embodiment of the present disclosure, a crack may be prevented from occurring in bonding the first cover member 30 to the second cover member 50 due to a step height which occurs in connecting signal lines. For example, in the vibration apparatus according to another example embodiment of the present disclosure, all of the first and second signal lines 92*a* and 92*b* may be provided at the upper surface of the vibration generating part 10, and thus, in a case where a signal line is provided between the first vibration part 10A and the second vibration part 10B, the occurrence of a defect such as a crack caused by bonding between the first vibration part 10A and the second vibration part 10B may be prevented.

Figure 9:
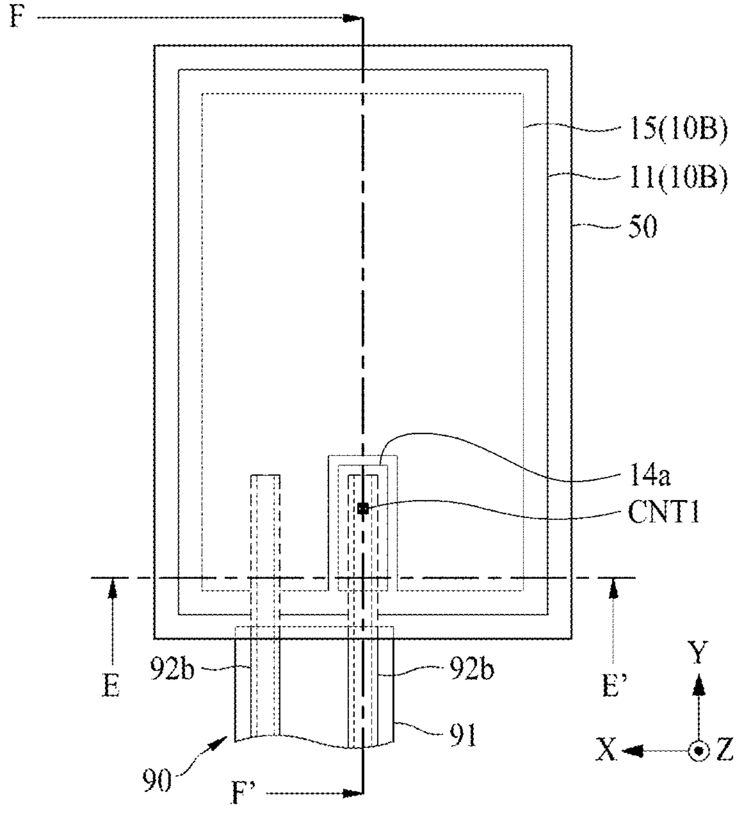
FIG. 9 illustrates a vibration apparatus according to another example embodiment of the present disclosure.
Figure 10:
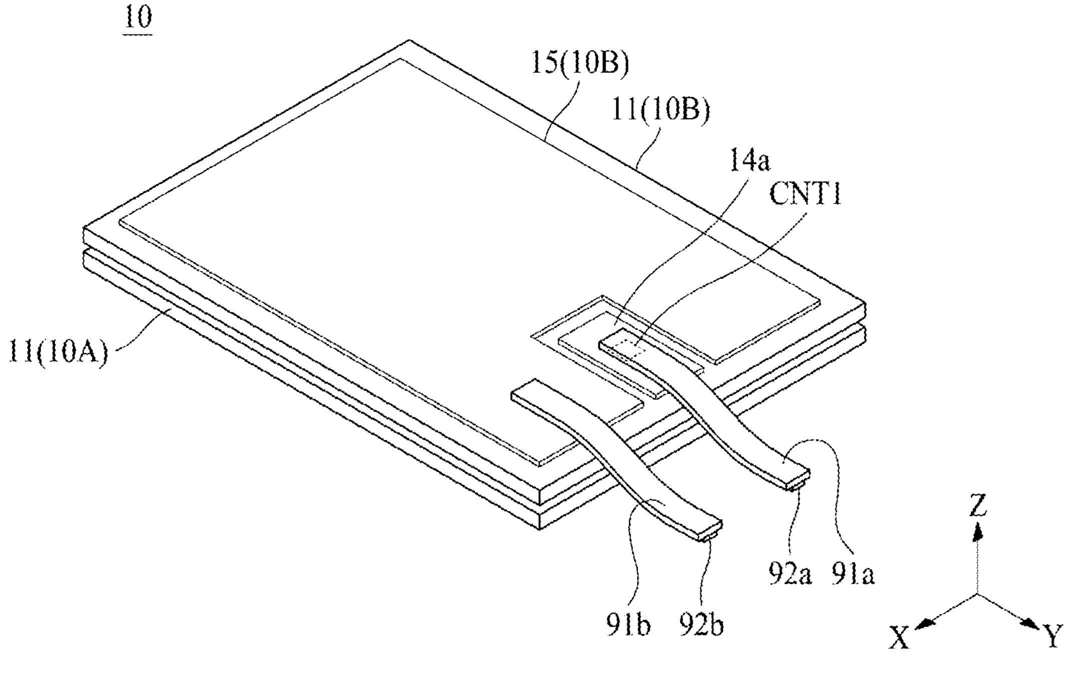
FIG. 10 is a perspective view illustrating a connection structure between a vibration generating part and a signal cable illustrated in FIG. 9 according to another example embodiment of the present disclosure.
Figure 11:
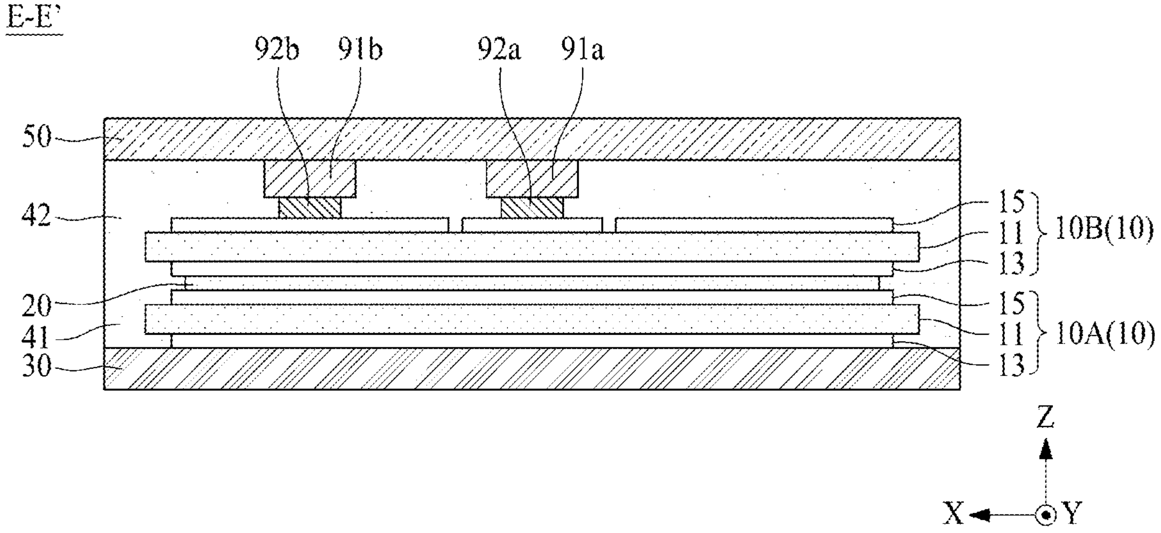
FIG. 11 is a cross-sectional view taken along line E-E' illustrated in FIG. 9 according to another example embodiment of the present disclosure.
Figure 12:
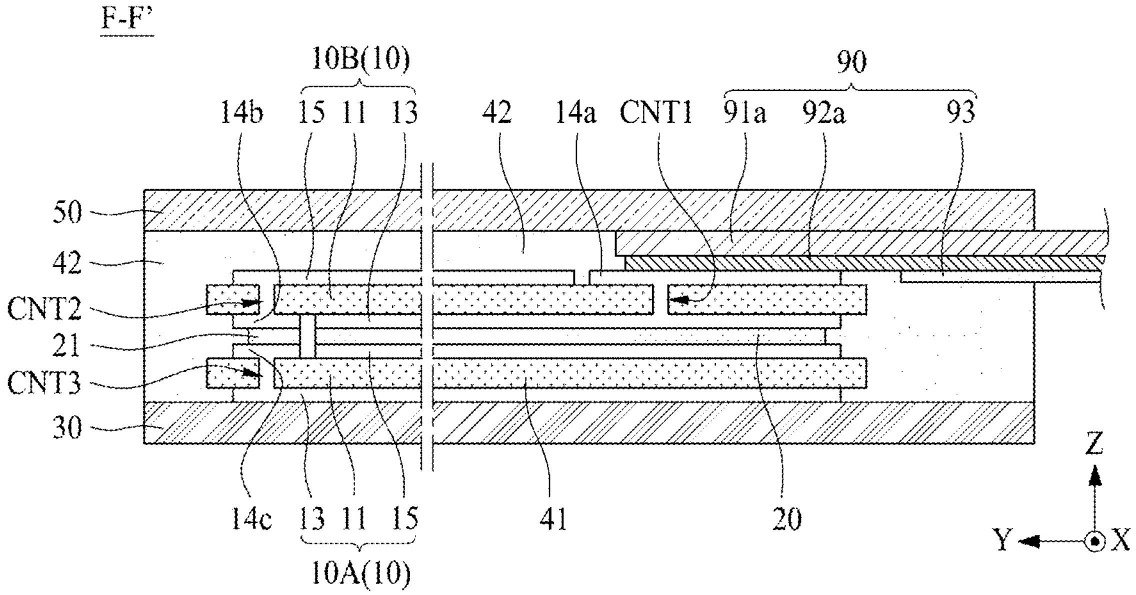
FIG. 12 is a cross-sectional view taken along line F-F' illustrated in FIG. 9 according to another example embodiment of the present disclosure.

FIG. 9 illustrates a vibration apparatus according to another example embodiment of the present disclosure. FIG. 10 is a perspective view illustrating a connection structure between a vibration generating part and a signal cable illustrated in FIG. 9 according to another example embodiment of the present disclosure. FIG. 11 is a cross-sectional view taken along line E-E' illustrated in FIG. 9 according to another example embodiment of the present disclosure. FIG. 12 is a cross-sectional view taken along line F-F' illustrated in FIG. 9 according to another example embodiment of the present disclosure. A vibration apparatus according to another example embodiment of the present disclosure described above with reference to FIGS. 9 to 12 may include a vibration layer, a second contact hole, and a third contact hole, and the other elements may be substantially the same as those of the vibration apparatus according to an example embodiment of the present disclosure described above with reference to FIGS. 5 to 8. Therefore, in describing FIGS. 9 to 12, elements other than the vibration layer, the second contact hole, and the third contact hole, and elements relevant thereto may be referred to by like reference numerals, and repetitive descriptions thereof may be omitted.

Referring to FIGS. 9 to 11, a second vibration part 10B according to another example embodiment of the present disclosure may include a vibration layer 11, a first electrode layer 13, a second electrode layer 15, a first auxiliary electrode layer 14*a*, and a second auxiliary electrode layer 14*b*.

The vibration layer 11 of the second vibration part 10B may include a first contact hole CNT1 and a second contact hole CNT2. For example, the first contact hole CNT1 and the second contact hole CNT2 may be provided at the vibration layer 11 of the second vibration part 10B. The first contact hole CNT1 may be provided at one end (or one side or one portion) of the vibration layer 11 connected to a signal cable 90. The second contact hole CNT2 may be provided at the other end (or the other side or the other portion), facing the one end (or the one side) where the first contact hole CNT1 is provided, of the vibration layer 11. The first contact hole CNT1 and the second contact hole CNT2 may be respectively provided in or at the one end (or one side or one portion) and the other end (or the other side or the other portion) of the vibration layer 11.

The first auxiliary electrode layer 14*a* may be spaced apart from the second electrode layer 15 of the second vibration part 10B, on a same layer as the second electrode layer 15. The first auxiliary electrode layer 14*a* may be disposed on a second surface (or an upper surface), which is opposite to or different from a first surface, of the vibration layer 11 provided at the second vibration part 10B. In the second vibration part 10B, the first auxiliary electrode layer 14*a* may be provided at an upper surface of the vibration layer 11 where the second electrode layer 15 is not provided.

The first auxiliary electrode layer 14*a* may overlap the first contact hole CNT1 provided at the vibration layer 11 provided at the second vibration part 10B. The first auxiliary electrode layer 14*a* may be connected to the first electrode layer 13 of the second vibration part 10B through or by the first contact hole CNT1. In this case, the first electrode layer 13 of the second vibration part 10B may be connected to the second electrode layer 15 of the first vibration part 10A by a first connection member 20. For example, the first auxiliary electrode layer 14*a*, the first electrode layer 13 of the second vibration part 10B, the first connection member 20, and the second electrode layer 15 of the first vibration part 10A may be electrically connected to one another.

The first auxiliary electrode layer 14*a* may contact a first signal line 92*a*. The first signal line 92*a* may be provided at an upper surface (or a top surface) of the first auxiliary electrode layer 14*a*. The first electrode layer 13 of the second vibration part 10B and the second electrode layer 15 of the first vibration part 10A may be electrically connected to the first signal line 92*a* through or by the first auxiliary electrode layer 14*a*. Accordingly, according to another example embodiment of the present disclosure, the first signal line 92*a* may be provided between the second cover member 50 and the second vibration part 10B.

The second auxiliary electrode layer 14*b* may be spaced apart from the first electrode layer 13 of the second vibration part 10B, on a same layer as the first electrode layer 13. The second auxiliary electrode layer 14*b* may be disposed at the first surface (or a lower surface), which is opposite to or different from the second surface of the vibration layer 11 provided in or at the second vibration part 10B. In the second vibration part 10B, the second auxiliary electrode layer 14*b* may be provided at a lower surface of the vibration layer 11 where the first electrode layer 13 is not provided.

The second auxiliary electrode layer 14*b* may overlap the second contact hole CNT2 provided in or at the vibration layer 11 of the second vibration part 10B. The second auxiliary electrode layer 14*b* may be connected to the second electrode layer 15 of the second vibration part 10B through or by the second contact hole CNT2. Furthermore, the second auxiliary electrode layer 14*b* may be connected to a third auxiliary electrode layer 14*c* and the first electrode layer 13 of the first vibration part 10A by a second connection member 21. For example, the first electrode layer 13 of the first vibration part 10A may be connected to the second electrode layer 15 of the second vibration part 10B by the second contact hole CNT2 and a third contact hole CNT3. For example, the second electrode layer 15 of the second vibration part 10B, the second auxiliary electrode layer 14*b*, the second connection member 21, the third auxiliary electrode layer 14*c*, and the first electrode layer 13 of the first vibration part 10A may be electrically connected to one another by the second contact hole CNT2 and the third contact hole CNT3. The second connection member 21 may be provided at a same layer as the first connection member 20 and may include the same conductive material, but embodiments of the present disclosure are not limited thereto. For example, the conductive material may include one or more of a copper (Cu) or silver (Ag) material, but embodiments of the present disclosure are not limited thereto.

For example, the second connection member 21 may be spaced apart from the first connection member 20 by a certain distance. For example, the second connection member 21 may have the same size as that of the second auxiliary electrode layer 14*b*, but embodiments of the present disclosure are not limited thereto.

The second electrode layer 15 of the second vibration part 10B may contact a second signal line 92*b*. The second signal line 92*b* may be provided at an upper surface (or a top surface) of the second electrode layer 15 of the second vibration part 10B. The second electrode layer 15 of the second vibration part 10B and the first electrode layer 13 of the first vibration part 10A may be electrically connected to the second signal line 92*b* through or by the second auxiliary electrode layer 14*b*. Accordingly, according to another example embodiment of the present disclosure, the second signal line 92*b* may be provided between the second cover member 50 and the second vibration part 10B.

The first vibration part 10A may include a vibration layer 11, a first electrode layer 13, a second electrode layer 15, and a third auxiliary electrode layer 14*c*.

The vibration layer 11 of the first vibration part 10A may include a third contact hole CNT3. The third contact hole CNT3 may be provided at the other end (or the other side or the other portion) of the vibration layer 11 which is not connected to the signal cable 90. The third contact hole CNT3 may be provided adjacent to the second contact hole CNT2. For example, the third contact hole CNT3 may overlap the second contact hole CNT2, but embodiments of the present disclosure are not limited thereto.

The third auxiliary electrode layer 14*c* may be spaced apart from the second electrode layer 15, on a same layer as the second electrode layer 15. The third auxiliary electrode layer 14*c* may be disposed at a second surface (or an upper surface), which is opposite to or different from a first surface of the vibration layer 11 provided in or at the first vibration part 10A. In the first vibration part 10A, the third auxiliary electrode layer 14*c* may be provided at an upper surface of the vibration layer 11 where the second electrode layer 15 is not provided.

The third auxiliary electrode layer 14*c* may overlap the third contact hole CNT3 provided at the vibration layer 11 of the first vibration part 10A. The third auxiliary electrode layer 14*c* may be connected to the vibration layer 11 of the first vibration part 10A through or by the third contact hole CNT3. Furthermore, the third auxiliary electrode layer 14*c* may be connected to the secondary auxiliary electrode layer 14*b* and the second electrode layer 15 of the second vibration part 10B by the second connection member 21. For example, the second electrode layer 15 of the second vibration part 10B may be connected to the first electrode layer 13 of the first vibration part 10A by the second contact hole CNT2, the second auxiliary electrode layer 14*b*, the second connection member 21, the third auxiliary electrode layer 14*c*, and the third contact hole CNT3. For example, the second connection member 21 may be a secondary connection member or an auxiliary connection member, but embodiments of the present disclosure are not limited thereto.

Therefore, the second electrode layer 15 of the second vibration part 10B may be electrically connected to the first electrode layer 13 of the first vibration part 10A. For example, the second electrode layer 15 of the second vibration part 10B and the first electrode layer 13 of the first vibration part 10A may be electrically connected to the second signal line 92*b* by the second contact hole CNT2, the second auxiliary electrode layer 14*b*, the second connection member 21, the third auxiliary electrode layer 14*c*, and the third contact hole CNT3.

Accordingly, in another example embodiment of the present disclosure, the second signal line 92*b* may be provided between the second cover member 50 and the second vibration part 10B. Further, in another example embodiment of the present disclosure, because the second electrode layer 15 of the second vibration part 10B is electrically connected to the first electrode layer 13 of the first vibration part 10A, the driving signal may be applied to the first electrode layer 13 of the first vibration part 10A. Therefore, in another example embodiment of the present disclosure, a third signal line for applying a signal to the first electrode layer 13 of the first vibration part 10A may not be provided.

In the first vibration part 10A, the first electrode layer 13 may receive the driving signal through the second signal line 92*b*, and the second electrode layer 15 may receive the driving signal through the first signal line 92*a*. Accordingly, the first vibration part 10A may alternately repeat contraction and/or expansion based on an inverse piezoelectric effect which is generated in the vibration layer 11 based on the driving signal, and thus, may vibrate (or displace or drive).

In the second vibration part 10B, the first electrode layer 13 may receive the driving signal through or by the first signal line 92*a*, and the second electrode layer 15 may receive the driving signal through the second signal line 92*b*. Accordingly, the second vibration part 10B may alternately repeat contraction and/or expansion based on an inverse piezoelectric effect which is generated in the vibration layer 11 based on the driving signal, and thus, may vibrate (or displace or drive).

In the vibration apparatus according to another example embodiment of the present disclosure, the first and second signal lines 92*a* and 92*b* of the signal cable 90 may be connected to the electrode layer of the vibration generating part 10 between the first cover member 30 and the second cover member 50, and thus, a soldering process for an electrical connection between the vibration generating part 10 and the signal cable 90 may not be needed, thereby simplifying a structure and a manufacturing process. Furthermore, the vibration apparatus according to another example embodiment of the present disclosure may include the plurality of vibration parts 10A and 10B which overlap or overlay each other to vibrate (or displace or drive) in the same direction, and thus, vibration efficiency or vibration characteristic may be enhanced and a vibration width (or a displacement width or a driving width) may be maximized, thereby enhancing a sound characteristic and/or a sound pressure level characteristic of a low-pitched sound band.

Moreover, in the vibration apparatus according to another example embodiment of the present disclosure, all of the first and second signal lines 92*a* and 92*b* of the signal cable 90 may be provided between the second cover member 50 and the vibration generating part 10, and thus, the first signal line 92*a* may not be provided between the plurality of vibration parts 10A and 10B, thereby decreasing a thickness and a step height of the vibration apparatus. Therefore, in the vibration apparatus according to another example embodiment of the present disclosure, a crack may be prevented from occurring in bonding the first cover member 30 to the second cover member 50 due to a step height which occurs in connecting signal lines. For example, in the vibration apparatus according to another example embodiment of the present disclosure, all of the first and second signal lines 92*a* and 92*b* may be provided at or on the upper surface of the vibration generating part 10, and thus, in a case where a signal line is provided between the first vibration part 10A and the second vibration part 10B, the occurrence of a defect such as a crack may be prevented.

Moreover, in the vibration apparatus according to another example embodiment of the present disclosure, because the second electrode layer 15 of the second vibration part 10B is electrically connected to the first electrode layer 13 of the first vibration part 10A, a signal line for applying a signal to the first electrode layer 13 of the first vibration part 10A may not be provided. Therefore, in the vibration apparatus according to another example embodiment of the present disclosure, a crack may be more effectively prevented from occurring in bonding the first cover member 30 to the second cover member 50 due to a step height which occurs in connecting signal lines.

Figure 13:
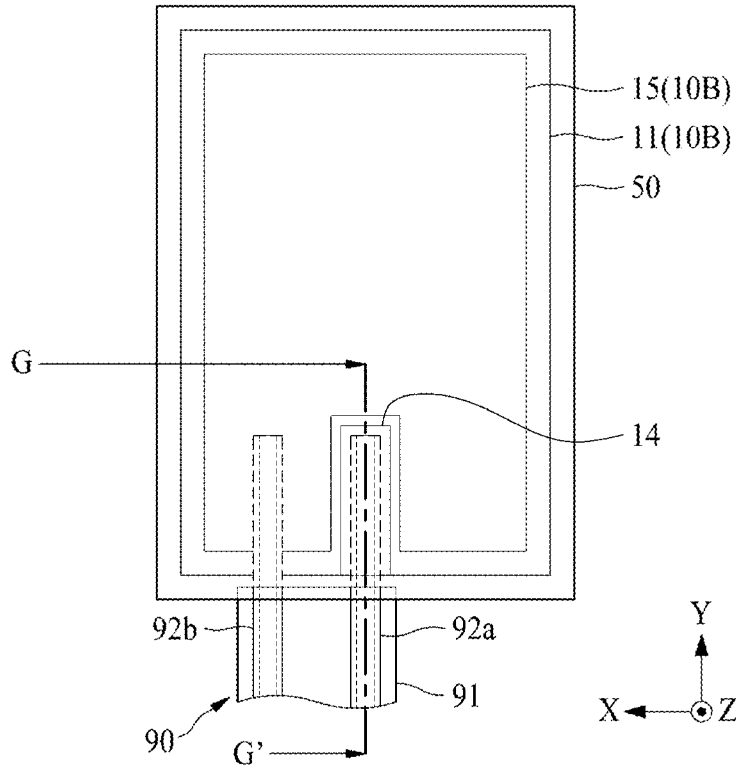
FIG. 13 illustrates a vibration apparatus according to another example embodiment of the present disclosure.
Figure 14:
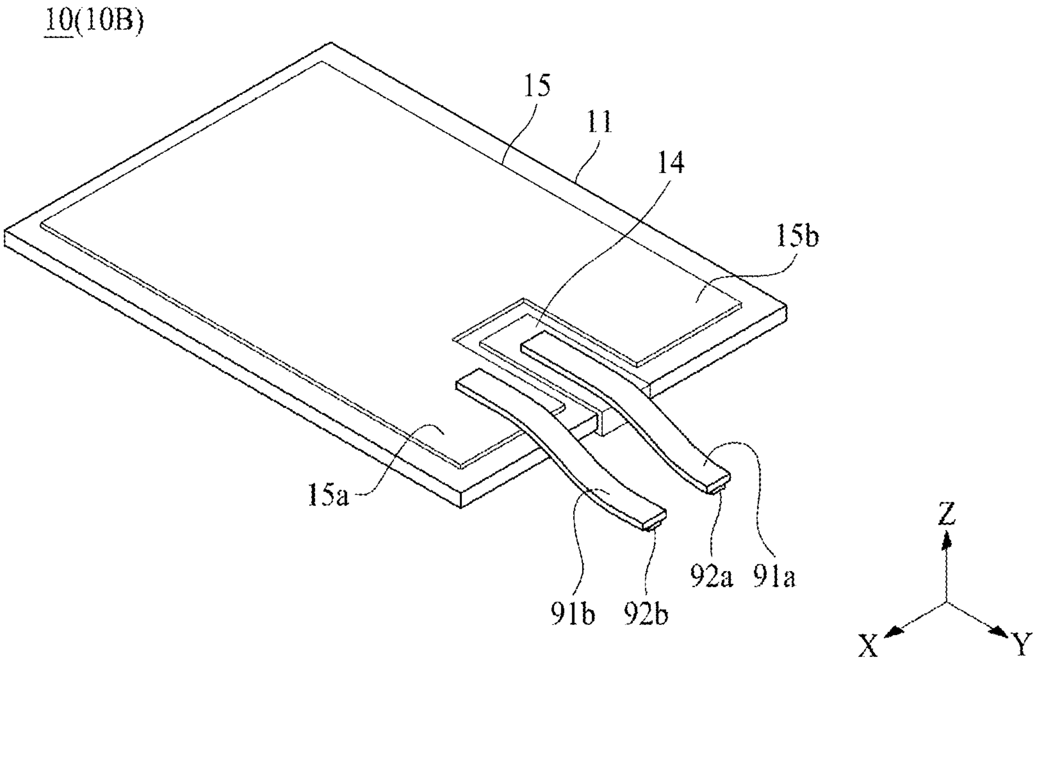
FIG. 14 is a perspective view illustrating a connection structure between a vibration generating part and a signal cable illustrated in FIG. 13 according to another example embodiment of the present disclosure.
Figure 15:
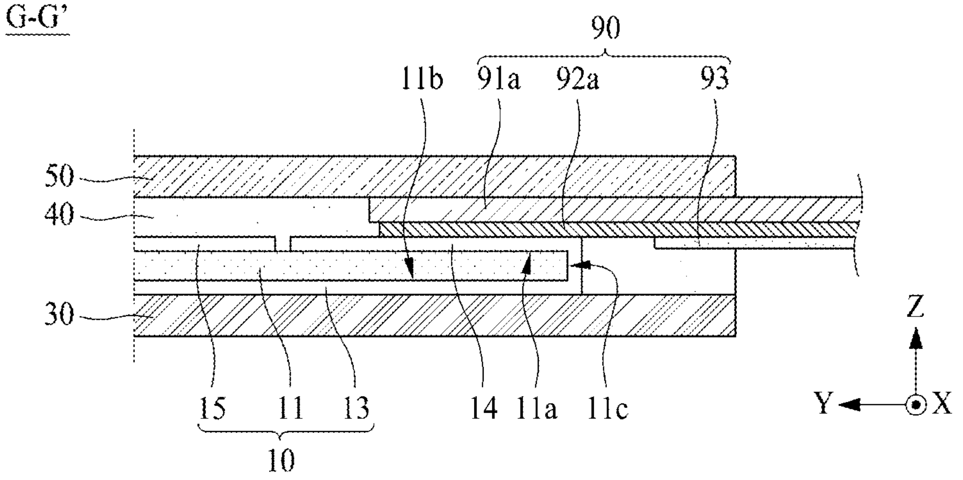
FIG. 15 is a cross-sectional view taken along line G-G' illustrated in FIG. 13 according to another example embodiment of the present disclosure.

FIG. 13 illustrates a vibration apparatus according to another example embodiment of the present disclosure. FIG. 14 is a perspective view illustrating a connection structure between a vibration generating part and a signal cable illustrated in FIG. 13 according to another example embodiment of the present disclosure. FIG. 15 is a cross-sectional view taken along line G-G' illustrated in FIG. 13 according to another example embodiment of the present disclosure. A vibration apparatus according to another example embodiment of the present disclosure described above with reference to FIGS. 13 to 15 may include an auxiliary electrode layer, and the elements except the auxiliary electrode layer may be substantially the same as those of the vibration apparatus according to an example embodiment of the present disclosure described above with reference to FIGS. 1 to 4. Therefore, in describing FIGS. 13 to 15, elements other than the auxiliary electrode layer and elements relevant thereto may be referred to by like reference numerals, and repetitive descriptions thereof may be omitted.

Referring to FIGS. 13 to 15, an auxiliary electrode layer 14 according to another example embodiment of the present disclosure may be disposed on or at a second surface (or an upper surface) 11*a*, which is different from or opposite to a first surface (or a lower surface) 11*b* of a vibration layer 11. The auxiliary electrode layer 14 may be provided at or on a same layer as a second electrode layer 15. The auxiliary electrode layer 14 may be provided on or at the second surface 11*a* of the vibration layer 11 and may extend along one lateral surface (or one side or one portion or a third surface) 11*c* of the vibration layer 11 extending vertically from the second surface 11*a* of the vibration layer 11. The auxiliary electrode layer 14 may be connected to a first electrode layer 13 and surround a portion of the one lateral surface (or one side or one portion) 11*c* of the vibration layer 11. For example, the auxiliary electrode layer 14 may be configured to surround the lateral surface 11*c* of the vibration layer 11 and may be connected to the first electrode layer 13. A first signal line 92*a* may be provided at a second surface (or an upper surface) of the auxiliary electrode layer 14. The first electrode layer 13 may be electrically connected to the first signal line 92*a* through or by the auxiliary electrode layer 14. Accordingly, the first signal line 92*a* may be provided between a vibration generating part 10 and a second cover member 50.

The second signal line 92*b* may be connected to the second electrode layer 15 and may be provided at or on a same layer as the first signal line 92*a*.

Therefore, in another example embodiment of the present disclosure, the first signal line 92*a* may be connected to the first electrode layer 13 through or by the auxiliary electrode layer 14 and the second signal line 92*b* may be connected to the second electrode layer 15 at the second surface (or the upper surface) 11*a* of the vibration layer 11. Accordingly, in another example embodiment of the present disclosure, the first signal line 92*a* and the second signal line 92*b* may be provided between the vibration generating part 10 and the second cover member 50, and thus, a step height occurring in connecting signal lines may decrease, thereby preventing damage such as a crack from occurring in a vibration apparatus due to a step height.

Figure 16:
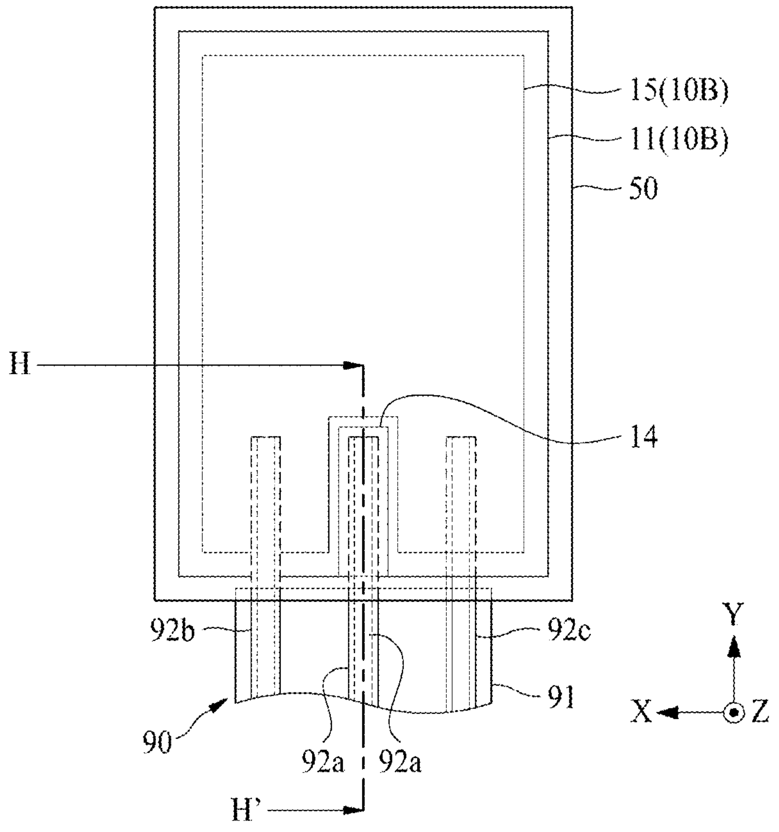
FIG. 16 illustrates a vibration apparatus according to another example embodiment of the present disclosure.
Figure 17:
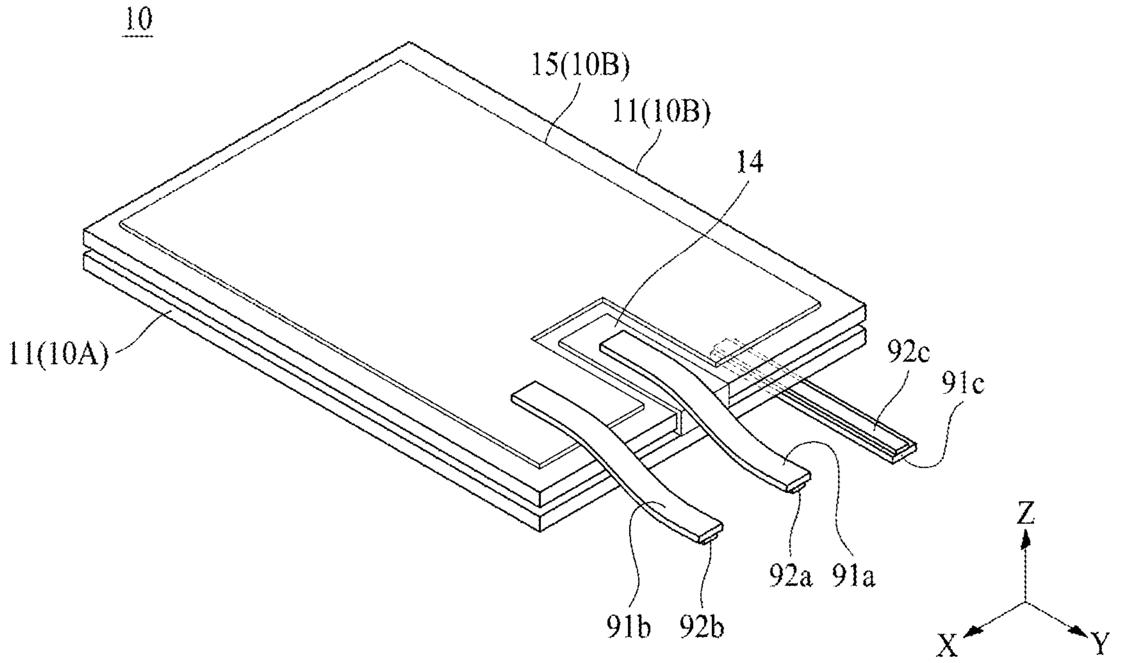
FIG. 17 is a perspective view illustrating a connection structure between a vibration generating part and a signal cable illustrated in FIG. 16 according to another example embodiment of the present disclosure.
Figure 18:
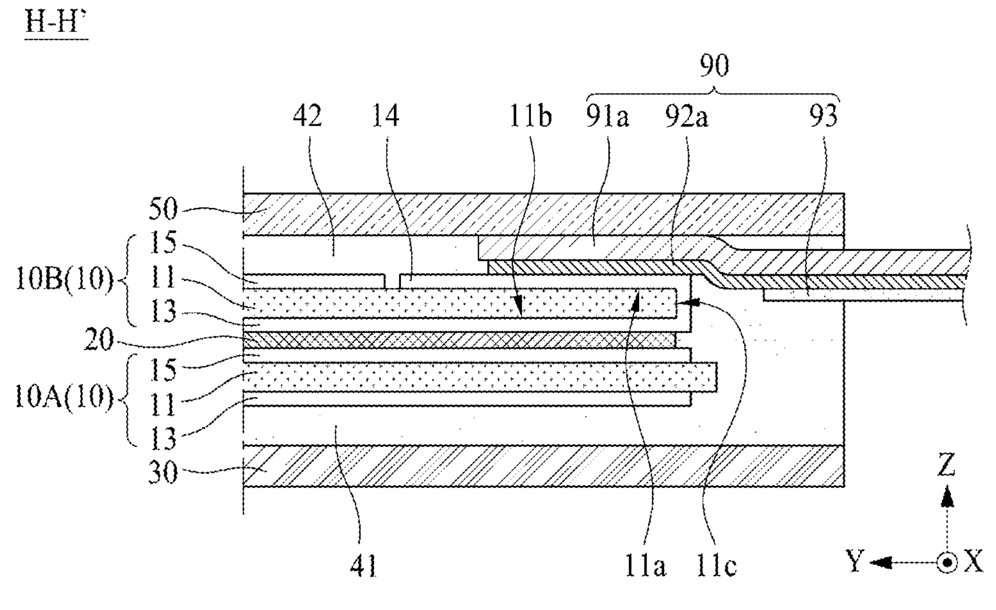
FIG. 18 is a cross-sectional view taken along line H-H' illustrated in FIG. 16 according to another example embodiment of the present disclosure.

FIG. 16 illustrates a vibration apparatus according to another example embodiment of the present disclosure. FIG. 17 is a perspective view illustrating a connection structure between a vibration generating part and a signal cable illustrated in FIG. 16 according to another example embodiment of the present disclosure. FIG. 18 is a cross-sectional view taken along line H-H' illustrated in FIG. 16 according to another example embodiment of the present disclosure. A vibration apparatus according to another example embodiment of the present disclosure described above with reference to FIGS. 16 to 18 may include an auxiliary electrode layer, and the elements except the auxiliary electrode layer may be substantially the same as those of the vibration apparatus according to an example embodiment of the present disclosure described above with reference to FIGS. 5 to 8. Therefore, in describing FIGS. 16 to 18, elements other than the auxiliary electrode layer and elements relevant thereto may be referred to by like reference numerals, and repetitive descriptions thereof may be omitted.

Referring to FIGS. 16 to 18, a second vibration part 10B according to another example embodiment of the present disclosure may include an auxiliary electrode layer 14. In the second vibration part 10B, the auxiliary electrode layer 14 may be disposed at a second surface (or an upper surface) 11*a*, which is different from or opposite to a first surface (or a lower surface) 11*b* of a vibration layer 11. In the second vibration part 10B, the auxiliary electrode layer 14 may extend along one lateral surface (or one side) (or a lateral surface) 11*c* of the vibration layer 11 extending vertically from the second surface 11*a* of the vibration layer 11. In the second vibration part 10B, the auxiliary electrode layer 14 may surround a portion of the one lateral surface (or the one side or the one portion or the lateral surface) 11*c* of the vibration layer 11 and may be connected to a first electrode layer 13 of the second vibration part 10B. For example, the auxiliary electrode layer 14 may be configured to surround the one lateral surface (or one side or one portion or a lateral surface) 11*c* of the vibration layer 11 of the second vibration part 10B and may be connected to the first electrode layer 13 of the second vibration part 10B.

A first signal line 92*a* may be provided at a second surface (or an upper surface) of the auxiliary electrode layer 14. The first electrode layer 13 may be electrically connected to the first signal line 92*a* through or by the auxiliary electrode layer 14. Accordingly, the first signal line 92*a* may be provided between a vibration generating part 10 and a second cover member 50.

In another example embodiment of the present disclosure, the first signal line 92*a* and the second signal line 92*b* may be provided between the vibration generating part 10 and the second cover member 50, and thus, a step height occurring in connecting signal lines may decrease, thereby preventing damage such as a crack from occurring in a vibration apparatus due to a step height.

Figure 19:
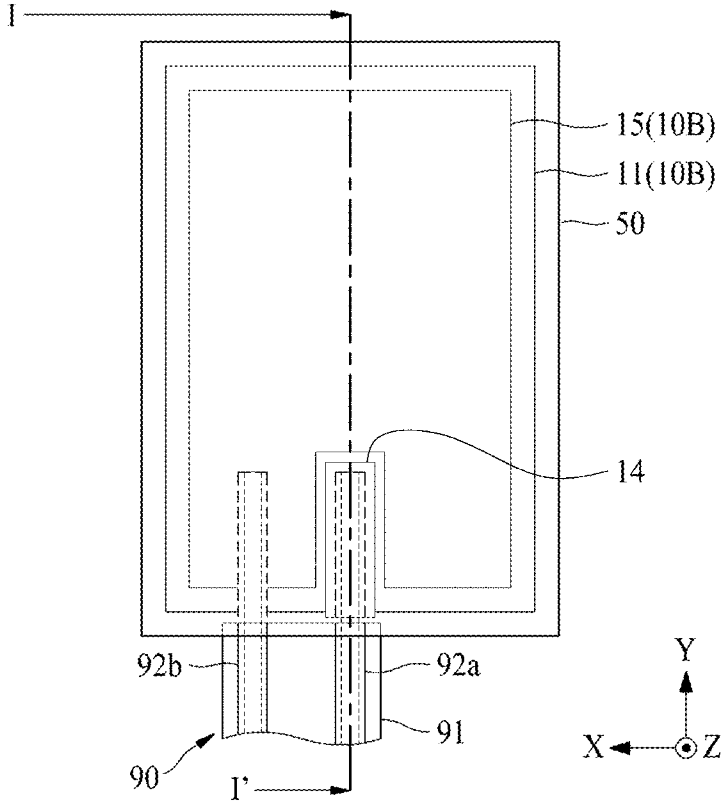
FIG. 19 illustrates a vibration apparatus according to another example embodiment of the present disclosure.
Figure 20:
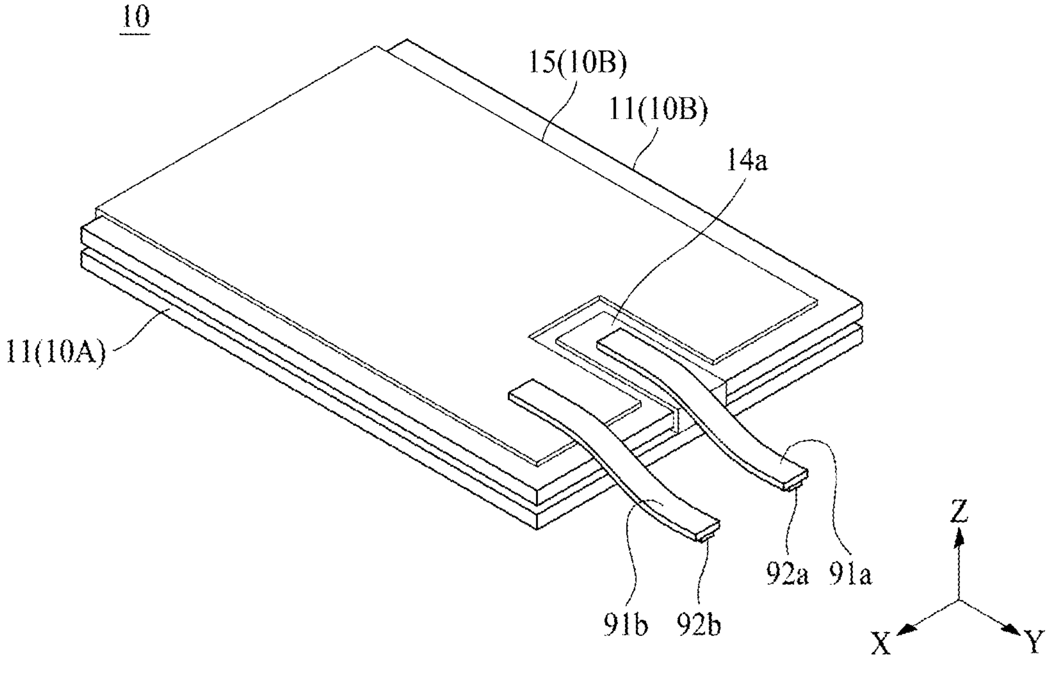
FIG. 20 is a perspective view illustrating a connection structure between a vibration generating part and a signal cable illustrated in FIG. 19 according to another example embodiment of the present disclosure.
Figure 21:
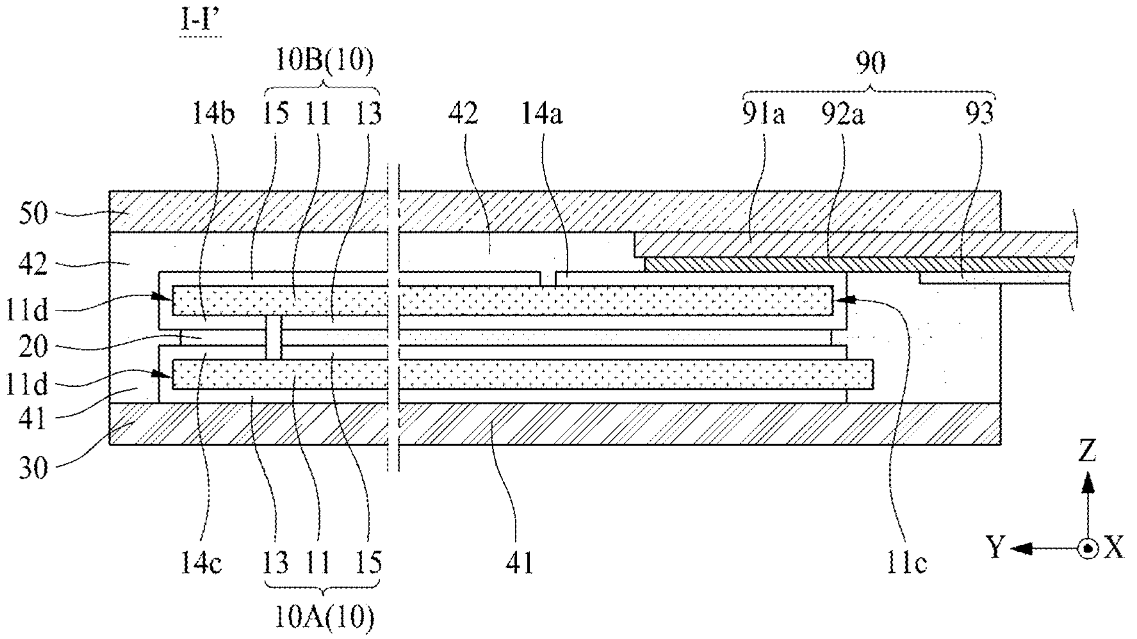
FIG. 21 is a cross-sectional view taken along line I-I' illustrated in FIG. 19 according to another example embodiment of the present disclosure.

FIG. 19 illustrates a vibration apparatus according to another example embodiment of the present disclosure. FIG. 20 is a perspective view illustrating a connection structure between a vibration generating part and a signal cable illustrated in FIG. 19 according to another example embodiment of the present disclosure. FIG. 21 is a cross-sectional view taken along line I-I' illustrated in FIG. 19 according to another example embodiment of the present disclosure. A vibration apparatus according to another example embodiment of the present disclosure described above with reference to FIGS. 19 to 21 may include a second auxiliary electrode layer and a third auxiliary electrode layer, and the elements except the second auxiliary electrode layer and the third auxiliary electrode layer may be substantially the same as those of the vibration apparatus according to an example embodiment of the present disclosure described above with reference to FIGS. 9 to 12. Therefore, in describing FIGS. 19 to 21, elements other than the second auxiliary electrode layer, the third auxiliary electrode layer, and elements relevant thereto may be referred to by like reference numerals, and repetitive descriptions thereof may be omitted.

Referring to FIGS. 19 to 21, a second vibration part 10B according to another example embodiment of the present disclosure may include a first auxiliary electrode layer 14*a* and a second auxiliary electrode layer 14*b*, and a first vibration part 10A may include a third auxiliary electrode layer 14*c*.

In the second vibration part 10B, the first auxiliary electrode layer 14*a* may be disposed at a second surface (or an upper surface) 11*a*, which is different from or opposite to a first surface (or a lower surface) 11*b* of a vibration layer 11. In the second vibration part 10B, the first auxiliary electrode layer 14*a* may extend along one lateral surface (or one side or the one portion or a lateral surface) 11*c* of the vibration layer 11 extending vertically from the second surface 11*a* of the vibration layer 11. In the second vibration part 10B, the first auxiliary electrode layer 14*a* may surround a portion of the one lateral surface (or the one side or the one portion or the lateral surface) 11*c* of the vibration layer 11 and may be connected to a first electrode layer 13 of the second vibration part 10B. For example, the first auxiliary electrode layer 14*a* may be configured to surround the one lateral surface (or one side or one portion or a lateral surface) 11*c* of the vibration layer 11. For example, the first auxiliary electrode layer 14*a* may be configured to surround the one lateral surface (or one side or one portion or a lateral surface) 11*c* of the vibration layer 11 of the second vibration part 10B and may be connected to the first electrode layer 13 of the second vibration part 10B. A first signal line 92*a* may be connected to an upper surface (or a top surface) of the first auxiliary electrode layer 14*a*. The first electrode layer 13 may be electrically connected to the first signal line 92*a* through or by the first auxiliary electrode layer 14*a*. Accordingly, the first signal line 92*a* may be provided between a vibration generating part 10 and a second cover member 50.

In the second vibration part 10B, the second auxiliary electrode layer 14*b* may be disposed at the first surface (or the lower surface) 11*b* of the vibration layer 11. In the second vibration part 10B, the second auxiliary electrode layer 14*b* may extend along the other lateral surface (or the other side or the other portion or a lateral surface) 11*d* of the vibration layer 11 extending vertically toward the second electrode layer 15 from the first surface 11*b* of the vibration layer 11. In the second vibration part 10B, the other lateral surface (or the other side or the other portion or the lateral surface) 11*d* of the vibration layer 11 may be a surface facing the one lateral surface (or the one side or the one portion or the lateral surface) 11*c* of the vibration layer 11. In the second vibration part 10B, the second auxiliary electrode layer 14*b* may surround a portion of the other lateral surface (or the other side or the other portion or the lateral surface) 11*d* of the vibration layer 11 and may be connected to a second electrode layer 15 of the second vibration part 10B. For example, the second auxiliary electrode layer 14*b* may be configured to surround the other lateral surface (or the other side or the other portion) (or the lateral surface) 11*d* of the vibration layer 11 of the second vibration part 10B. For example, the second auxiliary electrode layer 14*b* may be configured to surround the other lateral surface (or the other side or the other portion) (or the lateral surface) 11*c* of the vibration layer 11 of the second vibration part 10B and may be connected to the second electrode layer 15 of the second vibration part 10B.

In another example embodiment of the present disclosure, the first auxiliary electrode layer 14*a* may be configured to surround the one lateral surface (or the one side or the one portion or the lateral surface) 11*c* of the vibration layer 11 and the second auxiliary electrode layer 14*b* may be configured to surround the other lateral surface (or the other side or the other portion or the lateral surface) 11*d* of the vibration layer 11 of the second vibration part 10B, and thus, a contact hole (for example, a first contact hole and a second contact hole) may not be provided in or at the vibration layer 11 of the second vibration part 10B.

In the first vibration part 10A, the third auxiliary electrode layer 14*c* may be disposed at a second surface (or an upper surface) 11*a* of the vibration layer 11. In the first vibration part 10A, the third auxiliary electrode layer 14*c* may extend along the other lateral surface (or the other side or the other portion or a lateral surface) 11*d* of the vibration layer 11 extending vertically toward the first electrode layer 13 from the second surface 11*a* of the vibration layer 11. In the first vibration part 10A, the other lateral surface (or the other side or the other portion or the lateral surface) 11*d* of the vibration layer 11 may be a surface corresponding to the other lateral surface (or the other side or the other portion or the lateral surface) 11*d* of the vibration layer 11 of the second vibration part 10B. In the first vibration part 10A, the third auxiliary electrode layer 14*c* may surround a portion of the other lateral surface (or the other side or the other portion) (or the lateral surface) 11*d* of the vibration layer 11 of the first vibration part 10A and may be connected to a first electrode layer 13 of the first vibration part 10A. For example, the third auxiliary electrode layer 14*c* may be configured to surround the other lateral surface (or the other side or the other portion or the lateral surface) 11*d* of the vibration layer 11 of the first vibration part 10A. For example, the third auxiliary electrode layer 14*c* may be configured to surround the other lateral surface (or the other side or the other portion) (or the lateral surface) 11*d* of the vibration layer 11 of the first vibration part 10A and may be connected to the first electrode layer 13 of the first vibration part 10A. In another example embodiment of the present disclosure, the third auxiliary electrode layer 14*c* may be configured to surround the other lateral surface (or the other side or the other portion or the lateral surface) 11*d* of the vibration layer 11 of the first vibration part 10A, and thus, a contact hole (for example, a third contact hole) may not be provided in or at the vibration layer 11 of the first vibration part 10A.

The second auxiliary electrode layer 14*b* and the third auxiliary electrode layer 14*c* may be electrically connected to each other with a second connection member 21 therebetween. The second connection member 21 may include a conductive material. For example, the conductive material may include one or more of a copper (Cu) or silver (Ag) material, but embodiments of the present disclosure are not limited thereto.

The second signal line 92*b* may be connected to an upper surface (or a top surface) of the second electrode layer 15 provided at the second vibration part 10B. The first electrode layer 13 provided at the first vibration part 10A may be electrically connected to the second signal line 92*b* through or by the third auxiliary electrode layer 14*c*, the second connection member 21, and the second auxiliary electrode layer 14*b*.

Therefore, in another example embodiment of the present disclosure, the first signal line 92*a* and the second signal line 92*b* may be provided between the vibration generating part 10 and the second cover member 50. Accordingly, in another example embodiment of the present disclosure, because the first signal line 92*a* and the second signal line 92*b* are provided between the vibration generating part 10 and the second cover member 50, a step height occurring in connecting signal lines may decrease, thereby preventing damage such as a crack from occurring in a vibration apparatus due to a step height.

Moreover, in the vibration apparatus according to another example embodiment of the present disclosure, because the second electrode layer 15 of the second vibration part 10B is electrically connected to the first electrode layer 13 of the first vibration part 10A, a signal line for applying a signal to the first electrode layer 13 of the first vibration part 10A may not be provided. Therefore, in the vibration apparatus according to another example embodiment of the present disclosure, a crack may be more effectively prevented from occurring in bonding the first cover member 30 to the second cover member 50 due to a step height which occurs in connecting signal lines.

Figure 22:
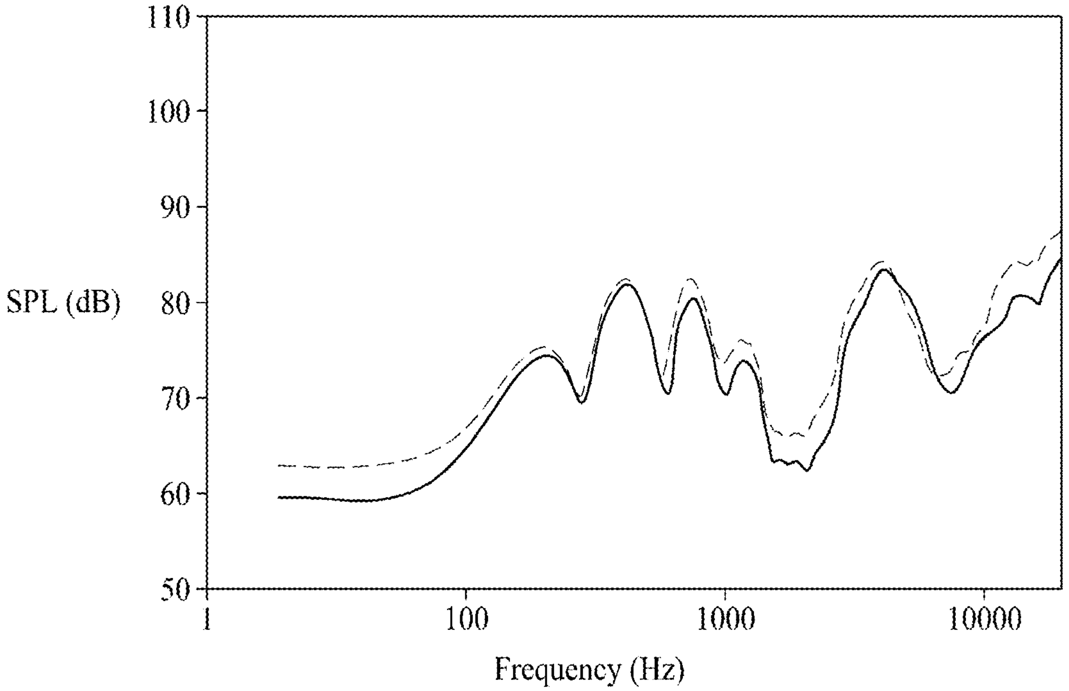
FIG. 22 is a graph showing a sound pressure level characteristic of an experimental example and a sound pressure level characteristic of an example embodiment 1 according to an example embodiment of the present disclosure.
Figure 23:
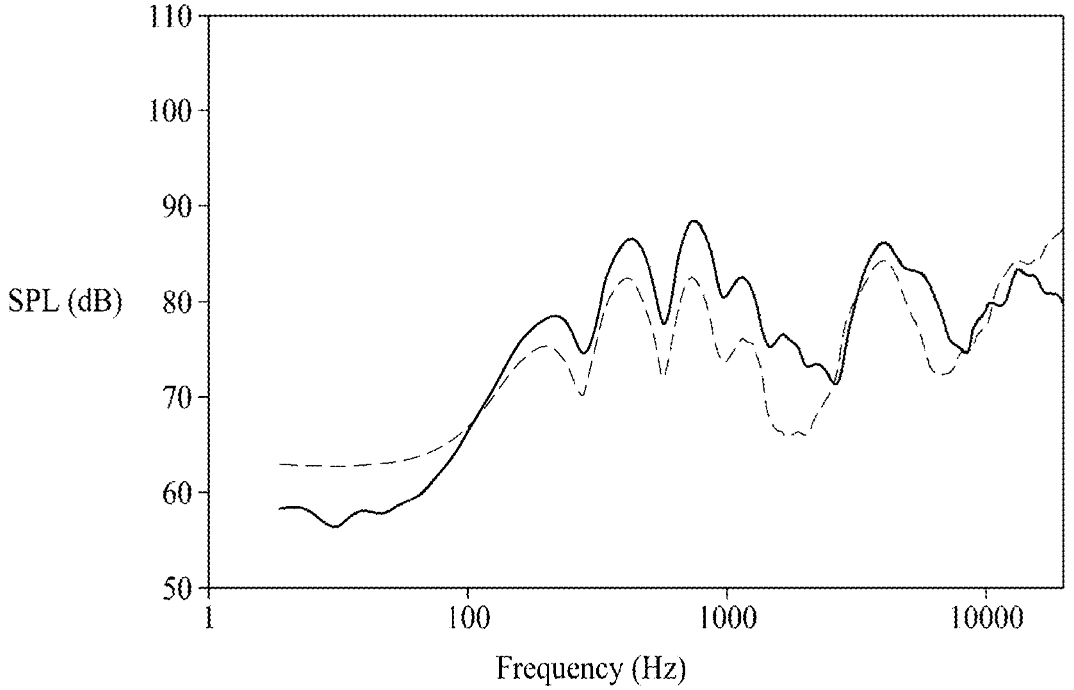
FIG. 23 is a graph showing a sound pressure level characteristic of an experimental example and a sound pressure level characteristic of an example embodiment 2 according to an example embodiment of the present disclosure.
Figure 24:
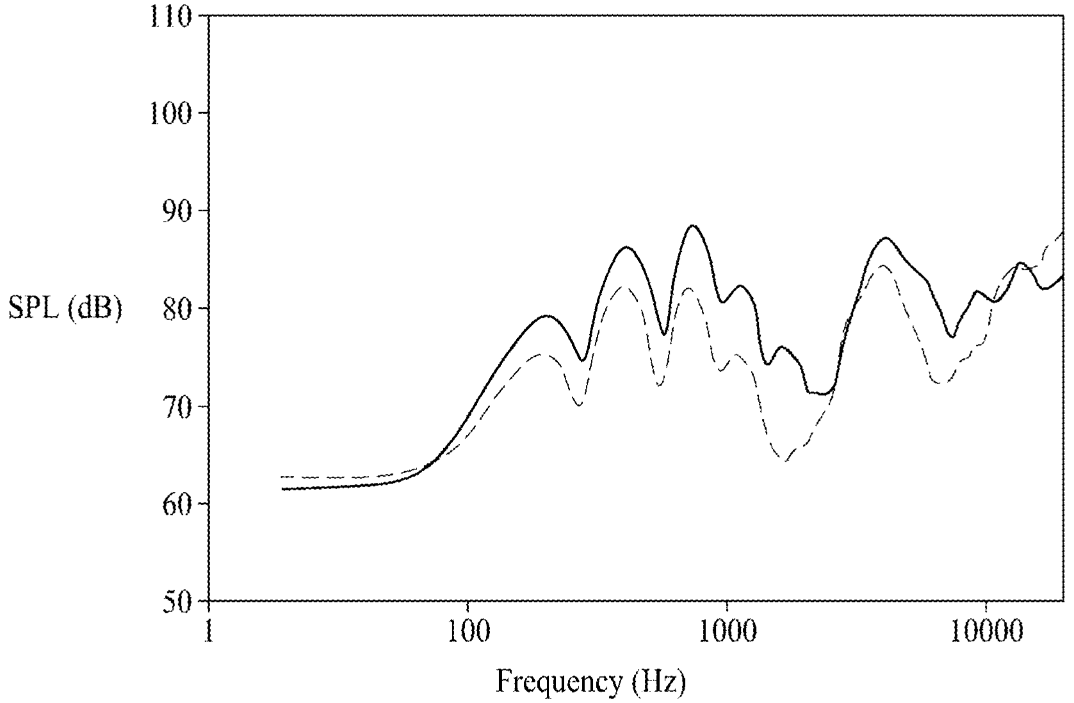
FIG. 24 is a graph showing a sound pressure level characteristic of an experimental example and a sound pressure level characteristic of an example embodiment 3 according to an example embodiment of the present disclosure.

FIG. 22 is a graph showing a sound pressure level characteristic of an experimental example and a sound pressure level characteristic of an example embodiment 1 according to an example embodiment of the present disclosure. FIG. 23 is a graph showing a sound pressure level characteristic of an experimental example and a sound pressure level characteristic of an example embodiment 2 according to an example embodiment of the present disclosure. FIG. 24 is a graph showing a sound pressure level characteristic of an experimental example and a sound pressure level characteristic of an example embodiment 3 according to an example embodiment of the present disclosure.

In FIGS. 22 to 24, the abscissa axis represents a frequency in hertz (Hz), and the ordinate axis represents a sound pressure level (SPL) in decibel (dB).

The inventors of the present disclosure have prepared an experimental example, an example embodiment 1, an example embodiment 2, and an example embodiment 3 as samples, so as to compare sound pressure level characteristics of vibration apparatuses according to some embodiments of the present disclosure.

A vibration apparatus according to the experimental example includes a vibration generating part having a single-layer structure, and the vibration generating part includes a vibration layer, a first electrode layer, and a second electrode layer. A first signal line is connected to a lower surface of the first electrode layer, and a second signal line is connected to an upper surface of the second electrode layer.

A vibration apparatus according to the example embodiment 1 has been manufactured identical to the vibration apparatus according to an example embodiment of the present disclosure described above with reference to FIGS. 13 to 15. For example, the vibration apparatus according to the example embodiment 1 is configured with a vibration generating part having a single-layer structure. The vibration generating part of the example embodiment 1 includes a vibration layer, a first electrode layer, a second electrode layer, and an auxiliary electrode layer. The auxiliary electrode layer is configured on a second surface of the vibration layer and extends along one lateral surface (or one side or one portion or a lateral surface) of the vibration layer vertically extending from the second surface of the vibration layer. Therefore, the auxiliary electrode layer is electrically connected to the first electrode layer. Furthermore, a first signal line is connected to an upper surface of the auxiliary electrode layer connected to the first electrode layer, and a second signal line is connected to an upper surface of the second electrode layer. Accordingly, the first signal line and the second signal line may be provided between the vibration generating part and a second cover member.

A vibration apparatus according to the example embodiment 2 has been manufactured identical to the vibration apparatus according to an example embodiment of the present disclosure described above with reference to FIGS. 16 to 18. For example, the vibration apparatus according to the example embodiment 2 includes a first vibration part and a second vibration part, which have a stack structure. The second vibration part includes a vibration layer, a first electrode layer, a second electrode layer, and an auxiliary electrode layer. The auxiliary electrode layer extends along a lateral surface of the vibration layer and is electrically connected to the first electrode layer. Furthermore, a first signal line is connected to an upper surface of the auxiliary electrode layer connected to the first electrode layer, a second signal line is connected to an upper surface of the second electrode layer of the second vibration part, and a third signal line is connected to a lower surface of the first electrode layer of the first vibration part. Accordingly, the first signal line and the second signal line may be provided between a vibration generating part and a second cover member.

A vibration apparatus according to the example embodiment 3 has been manufactured identical to the vibration apparatus according to an example embodiment of the present disclosure described above with reference to FIGS. 5 to 8. For example, the vibration apparatus according to the example embodiment 3 includes a first vibration part and a second vibration part, which have a stack structure. The second vibration part includes a vibration layer, a first electrode layer, a second electrode layer, and an auxiliary electrode layer. A contact hole is provided in or at the vibration layer of the second vibration part, and the auxiliary electrode layer is electrically connected to the first electrode layer through or by a contact hole. Furthermore, a first signal line adjoins an upper surface of the auxiliary electrode layer connected to the first electrode layer of the second vibration part through or by the contact hole, a second signal line is connected to an upper surface of the second electrode layer of the second vibration part, and a third signal line is connected to a lower surface of the first electrode layer of the first vibration part. Accordingly, the first signal line and the second signal line may be provided between a vibration generating part and a second cover member.

Referring to FIG. 22, in a graph, a dotted line represents a sound pressure level characteristic of the experimental example, and a solid line represents a sound pressure level characteristic of the example embodiment 1. It may be seen that a sound pressure level characteristic based on a frequency of the example embodiment 1 of the present disclosure is similar to the experimental example. For example, in the example embodiment 1, because all of the first signal line and the second signal line are provided between the vibration generating part and the second cover member, it may be seen that the example embodiment 1 shows a sound pressure level characteristic similar to the experimental example and prevents a defect such as a crack from occurring in a bonding process.

Referring to FIG. 23, in a graph, a dotted line represents a sound pressure level characteristic of the experimental example, and a solid line represents a sound pressure level characteristic of the example embodiment 2. It may be seen that a sound pressure level characteristic based on a frequency of the example embodiment 2 of the present disclosure is enhanced by 5 dB or more in sound pressure level characteristic within a frequency range of 20 Hz to 10 kHz compared to the experimental example. For example, comparing with the experimental example, it may be seen that the example embodiment 2 increases by about 5 dB or more in sound pressure level in a frequency of 100 Hz to 1 kHz. For example, comparing with the experimental example, it may be seen that the example embodiment 2 increases by about 10 dB or more in sound pressure level in a frequency of 1 kHz to 3 kHz.

When a vibration apparatus is manufactured having a stack structure, because a signal line for applying a driving signal to a middle electrode layer (for example, a first electrode layer of a second vibration part and a second electrode layer of a first vibration part) may not be inserted (or accommodated) between a plurality of vibration parts, a step height caused by inserting (or accommodating) of the signal line may be reduced. Accordingly, comparing with the experimental example, it may be seen that the example embodiment 2 is enhanced in sound pressure level characteristic and decreases a defect such as a crack in a bonding process.

Referring to FIG. 24, in a graph, a dotted line represents a sound pressure level characteristic of the experimental example, and a solid line represents a sound pressure level characteristic of the example embodiment 3. It may be seen that a sound pressure level characteristic based on a frequency of the example embodiment 3 of the present disclosure is enhanced by 5 dB or more in sound pressure level characteristic within a frequency range of 20 Hz to 10 kHz compared to the experimental example. For example, comparing with the experimental example, it may be seen that the example embodiment 3 increases by about 5 dB or more in sound pressure level in a frequency of 100 Hz to 1 kHz. For example, comparing with the experimental example, it may be seen that the example embodiment 3 increases by about 10 dB or more in sound pressure level in a frequency of 1 kHz to 3 kHz.

When a vibration apparatus is manufactured having a stack structure, because a signal line for applying a driving signal to a middle electrode layer (or an intermediate electrode layer) (for example, a first electrode layer of a second vibration part and a second electrode layer of a first vibration part) may not be inserted (or accommodated) between a plurality of vibration parts, a step height caused by inserting (or accommodating) of the signal line may be reduced. Accordingly, comparing with the experimental example, it may be seen that the example embodiment 3 is enhanced in sound pressure level characteristic and decreases a defect such as a crack in a bonding process.

The following Table 1 shows an initial sound pressure level of the experimental example and initial sound pressure levels of the example embodiment 1 and the example embodiment 2 according to an example embodiment of the present disclosure. For example, each of the initial sound pressure level may be a first measurement voltage of a first-manufactured sample, instead of an average value obtained from several measurements for evaluating reproducibility of each sample.

According to an example embodiment of the present disclosure, a sound output characteristic may be measured by a sound measurement apparatus. The sound measurement apparatus may include a sound card which transmits or receives a sound to or from a control personal computer (PC), an amplifier which amplifies a signal generated from the sound card and transfers the amplified signal to an apparatus, and a microphone which collects a sound generated from a vibration of the vibration apparatus in a display panel. For example, the microphone may be disposed at a center of the apparatus, and a distance between the display panel and the microphone may be about 30 cm. A sound may be measured in a state where the microphone is vertical to the apparatus. The sound collected by the microphone may be input to the control PC through the sound card, and the sound of the apparatus may be analyzed through checking in a control program. For example, a sound pressure level characteristic in a frequency range of 20 Hz to 20 kHz may be measured by using a pulse program. In sine sweep of 20 Hz to 20 kHz, a measurement has been performed by applying ⅓ octave smoothing.

TABLE 1

| | Experimental Example | Experiment 1 | Experiment 2 |
|---|---|---|---|
| Initial sound pressure level (dB) | 74.88 | 73.85 | 79.88 |

Referring to Table 1, the initial sound pressure level of the experimental example and the initial sound pressure levels of the example embodiment 1 and the example embodiment 2 have been measured to be 74.88 dB, 73.85 dB, and 79.88 dB. In the experimental example and the example embodiment 1, it may be seen that the initial sound pressure levels are similar. In the experimental example and the example embodiment 2, it may be seen that the initial sound pressure level of the example embodiment 2 is higher than the initial sound pressure level of the experimental example.

Therefore, it may be seen that the example embodiment 1 maintains an initial sound pressure level similar to the experimental example, reduces a step height caused by inserting (or accommodating) of a signal line, and decreases a defect such as a crack in a bonding process.

Moreover, comparing with the experimental example, it may be seen that the example embodiment 2 is enhanced in sound pressure level characteristic and decreases a defect such as a crack in a bonding process.

Figure 25:
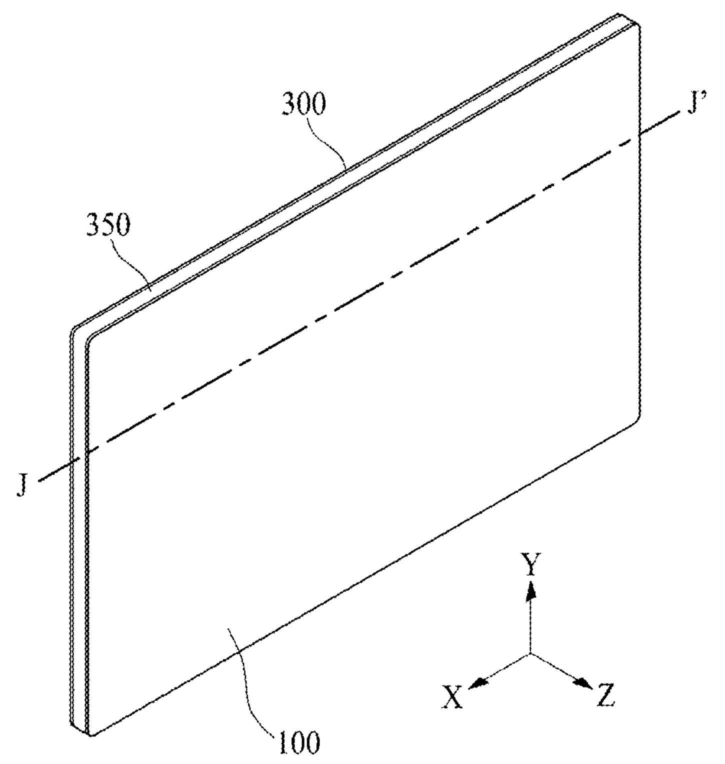
FIG. 25 illustrates an apparatus according to an example embodiment of the present disclosure.
Figure 26:
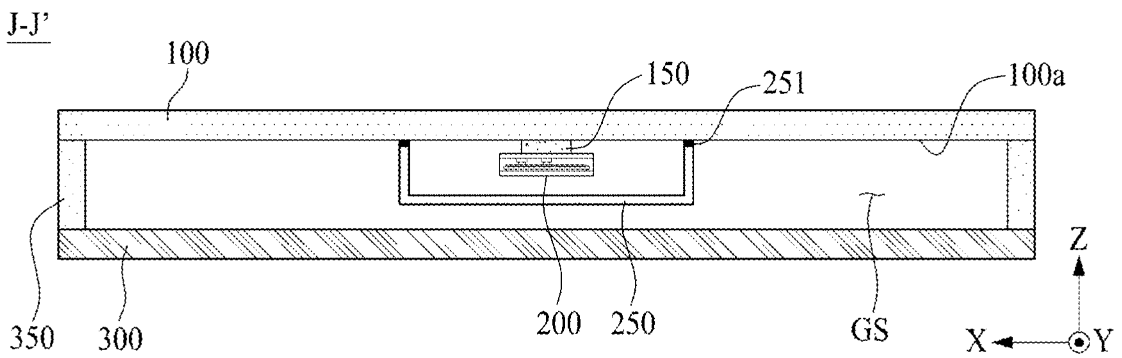
FIG. 26 is a cross-sectional view taken along line J-J' illustrated in FIG. 25 according to an example embodiment of the present disclosure.

FIG. 25 illustrates an apparatus according to an example embodiment of the present disclosure. FIG. 26 is a cross-sectional view taken along line J-J' illustrated in FIG. 25 according to an example embodiment of the present disclosure.

Referring to FIGS. 25 and 26, an apparatus according to an example embodiment of the present disclosure may include a passive vibration member 100 and one or more vibration generating apparatuses 200 which may be or include any of the embodiments described for the vibration apparatus 10.

The apparatus according to an example embodiment of the present disclosure may be a display apparatus, a sound apparatus, a sound generating apparatus, a sound bar, an analog signage, or a digital signage, or the like, but embodiments of the present disclosure are not limited thereto.

The display apparatus may include a display panel including a plurality of pixels which implement a black/white or color image and a driver for driving the display panel. An image according to an example embodiment of the present disclosure may include an electronic image, a digital image, a still image, or a video image, but embodiments of the present disclosure are not limited thereto. For example, the display panel may be an organic light emitting display panel, a light emitting diode display panel, an electrophoresis display panel, an electro-wetting display panel, a micro light emitting diode display panel, or a quantum dot light emitting display panel, or the like, but embodiments of the present disclosure are not limited thereto. For example, in the organic light emitting display panel, a pixel may include an organic light emitting device such as an organic light emitting layer or the like, and the pixel may be a subpixel which implements any one of a plurality of colors configuring a color image. Therefore, an apparatus according to an example embodiment of the present disclosure may include a set device (or a set apparatus) or a set electronic device such as a notebook computer, a television (TV), a computer monitor, an equipment apparatus including an automotive apparatus or another type apparatus for vehicles, or a mobile electronic device such as a smartphone, or an electronic pad, or the like which is a complete product (or a final product) including a display panel such as an organic light emitting display panel, a liquid crystal display panel, or the like.

The analog signage may be an advertising signboard, a poster, a noticeboard, or the like. The analog signage may include content such as a sentence, a picture, and a sign, or the like. The content may be disposed at the passive vibration member 100 of the apparatus to be visible. For example, the content may be directly attached on the passive vibration member 100 and the content may be printed or the like on a medium such as paper, and the medium may be attached on the passive vibration member 100.

The passive vibration member 100 may vibrate based on driving (or vibration) of the one or more vibration generating apparatuses 200. For example, the passive vibration member 100 may generate one or more of a vibration and a sound based on driving of the one or more vibration generating apparatuses 200.

The passive vibration member 100 according to an example embodiment of the present disclosure may be a display panel including a display area (or a screen) having a plurality of pixels which implement a black/white or color image. Thus, the passive vibration member 100 may generate one or more of a vibration and a sound based on driving of the one or more vibration generating apparatuses 200. For example, the passive vibration member 100 may vibrate based on a vibration of the vibration generating apparatus 200 while a display area is displaying an image, and thus, may generate or output a sound synchronized with the image displayed on the display area. For example, the passive vibration member 100 according to an example embodiment of the present disclosure may be a vibration object, a display member, a display panel, a signage panel, a passive vibration plate, a front cover, a front member, a vibration panel, a sound panel, a passive vibration panel, a sound output plate, a sound vibration plate, or a video screen, but embodiments of the present disclosure are not limited thereto.

According to another example embodiment of the present disclosure, the passive vibration member 100 may be a vibration plate including a metal material or a nonmetal material (or a complex nonmetal material), which has a material characteristic suitable for outputting a sound based on a vibration of each of the one or more vibration generating apparatuses 200. For example, the passive vibration member 100 may be a vibration plate including one or more materials of metal, plastic, paper, fiber, cloth, wood, leather, rubber, glass, carbon, and mirror. For example, the paper may be a cone paper for speakers. For example, the cone paper may be pulp or foam plastic, but embodiments of the present disclosure are not limited thereto.

The passive vibration member 100 according to another example embodiment of the present disclosure may include a display panel including a pixel displaying an image, or may include a non-display panel. For example, the passive vibration member 100 may include one or more of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, and mirror, but embodiments of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but embodiments of the present disclosure are not limited thereto.

The one or more vibration generating apparatuses 200 may be configured to vibrate the passive vibration member 100. The one or more vibration generating apparatuses 200 may be configured to be connected to a rear surface 100*a* of the passive vibration member 100 by using a connection member 150. Accordingly, the one or more vibration generating apparatuses 200 may vibrate the passive vibration member 100, and thus, may generate or output one or more of a vibration and a sound, based on a vibration of the passive vibration member 100.

The one or more vibration generating apparatuses 200 may include one or more of the vibration apparatuses described above with reference to FIGS. 1 to 24. Accordingly, the descriptions of the vibration apparatuses provided with reference to FIGS. 1 to 24 may be applicable to the vibration apparatuses illustrated with reference to FIGS. 25 to 26, and thus, like reference numerals may refer to like elements and repetitive descriptions thereof may be omitted.

The connection member 150 may be disposed between at least a portion of the vibration generating apparatus 200 and the passive vibration member 100. The connection member 150 may be connected between at least a portion of the vibration generating apparatus 200 and the passive vibration member 100. The connection member 150 according to an example embodiment of the present disclosure may be connected between a center portion, except a periphery portion (or an edge portion), of the vibration generating apparatus 200 and the passive vibration member 100. For example, the connection member 150 may be connected between the center portion of the vibration generating apparatus 200 and the passive vibration member 100, based on a partial attachment scheme. The center portion (or a middle portion) of the vibration generating apparatus 200 may be a center of a vibration, and thus, a vibration of the vibration generating apparatus 200 may be efficiently transferred to the passive vibration member 100 through the connection member 150. The periphery portion (or the edge portion) of the vibration generating apparatus 200 may be in a state where the periphery portion (or the edge portion) of the vibration generating apparatus 200 is raised from each of the connection member 150 and the passive vibration member 100 without being connected to the connection member 150 and/or the passive vibration member 100, and thus, when a flexural vibration (or a bending vibration) of the vibration generating apparatus 200 is performed, a vibration of the edge portion of the vibration generating apparatus 200 may not be reduced (prevented) by the connection member 150 and/or the passive vibration member 100, and thus, a vibration width (or a displacement width or a driving width) of the vibration generating apparatus 200 may increase. Accordingly, a vibration width (or a displacement width or a driving width) of the passive vibration member 100 based on a vibration of the vibration generating apparatus 200 may increase, and thus, a sound characteristic and a sound pressure level characteristic of a low-pitched sound band generated based on a vibration of the passive vibration member 100 may be further enhanced.

According to another example embodiment of the present disclosure, the connection member 150 may be connected to or attached on or at an entire front surface of the one or more vibration generating apparatuses 200 and the rear surface 100*a* of the passive vibration member 100, based on a front attachment scheme.

The connection member 150 according to an example embodiment of the present disclosure may include a material including an adhesive layer which is good in adhesive force or attaching force with respect to the rear surface 100*a* of the passive vibration member 100 or the display panel and each of the one or more vibration generating apparatuses 200. For example, the connection member 150 may include a foam pad, a double-sided tape, an adhesive, or the like, but embodiments of the present disclosure are not limited thereto. For example, an adhesive layer of the connection member 150 may include epoxy, acryl, silicone, or urethane, but embodiments of the present disclosure are not limited thereto. For example, the adhesive layer of the connection member 150 may include an acryl-based material, having a characteristic where an adhesive force is relatively good and hardness is high, comparted to a urethane-based material. Accordingly, a vibration of each of the one or more vibration generating apparatuses 200 may be well transferred to the passive vibration member 100.

The apparatus according to an example embodiment of the present disclosure may further include a supporting member 300 and a coupling member 350.

The supporting member 300 may be disposed at the rear surface 100*a* of the passive vibration member 100. The supporting member 300 may be disposed at the rear surface 100*a* of the passive vibration member 100 to cover the vibration generating apparatus 200. The supporting member 300 may be disposed at the rear surface 100*a* of the passive vibration member 100 to cover an entire of the rear surface 100*a* of the passive vibration member 100 and the vibration generating apparatus 200. For example, the supporting member 300 may have a size which is equal to that of the passive vibration member 100. For example, the supporting member 300 may cover the rear surface 100*a* of the passive vibration member 100 with the vibration generating apparatus 200 and a gap space GS therebetween. For example, the supporting member 300 may cover the entire rear surface 100*a* of the passive vibration member 100 with the vibration generating apparatus 200 and the gap space GS therebetween. The gap space GS may be provided by the coupling member 350 disposed between the passive vibration member 100 and the supporting member 300 facing each other. The gap space GS may be referred to as an air gap, an accommodating space, a vibration space, and a sound sounding box, but embodiments of the present disclosure are not limited thereto.

The supporting member 300 may include one or more materials of a glass material, a metal material, and a plastic material. The supporting member 300 may have a stack structure where one or more materials of a glass material, a metal material, and a plastic material are stacked.

Each of the passive vibration member 100 and the supporting member 300 may have a square shape or a rectangular shape, but embodiments of the present disclosure are not limited thereto. For example, each of the passive vibration member 100 and the supporting member 300 may have a polygonal shape, a non-polygonal shape, a circular shape, or an oval shape. For example, in a case where the apparatus according to an example embodiment of the present disclosure is applied to a sound apparatus or a sound bar, each of the passive vibration member 100 and the supporting member 300 may have a rectangular shape where a long-side length is twice or more longer than a short-side length, but embodiments of the present disclosure are not limited thereto.

The coupling member 350 may be configured to be connected between a rear edge portion (or a rear periphery portion) of the passive vibration member 100 and a front edge portion (or a front periphery portion) of the supporting member 300, and thus, the gap space GS may be provided between the passive vibration member 100 and the supporting member 300 facing each other.

The coupling member 350 according to an example embodiment of the present disclosure may include an elastic material which has adhesive properties and is capable of compression and decompression. For example, the coupling member 350 may include a double-side tape, a single-sided tape, or a double-side adhesive foam pad, but embodiments of the present disclosure are not limited thereto. For example, the coupling member 350 may include an elastic pad such as a rubber pad or a silicone pad, which has adhesive properties and is capable of compression and decompression. For example, the coupling member 350 may be formed by an elastomer.

As another example, the supporting member 300 may further include a sidewall portion which supports the rear edge portion (or the rear periphery portion) of the passive vibration member 100. The sidewall portion of the supporting member 300 may protrude or be bent toward the rear edge portion (or the rear periphery portion) of the passive vibration member 100 from the front edge portion (or the front periphery portion) of the supporting member 300, and thus, the gap space GS may be provided between the passive vibration member 100 and the supporting member 300. In this case, the coupling member 350 may be configured to be connected between the sidewall portion of the supporting member 300 and the rear edge portion (or the rear periphery portion) of the passive vibration member 100. Accordingly, the supporting member 300 may cover the one or more vibration generating apparatuses 200 and may support the rear surface 100*a* of the passive vibration member 100. For example, the supporting member 300 may cover the one or more vibration generating apparatuses 200 and may support the rear edge portion (or the rear periphery portion) of the passive vibration member 100.

As another example, the passive vibration member 100 may further include a sidewall portion which is connected to the front edge portion (or the front periphery portion) of the supporting member 300. The sidewall portion of the passive vibration member 100 may protrude or be bent toward the front edge portion (or the front periphery portion) of the supporting member 300 from the rear edge portion (or the rear periphery portion) of the passive vibration member 100, and thus, the gap space GS may be provided between the passive vibration member 100 and the supporting member 300. The passive vibration member 100 may increase in stiffness by the sidewall portion thereof. In this case, the coupling member 350 may be configured to be connected between the sidewall portion of the passive vibration member 100 and the rear edge portion (or the rear periphery portion) of the supporting member 300. Accordingly, the supporting member 300 may cover the one or more vibration generating apparatuses 200 and may support the rear surface 100*a* of the passive vibration member 100. For example, the supporting member 300 may cover the one or more vibration generating apparatuses 200 and may support the rear edge portion (or the rear periphery portion) of the passive vibration member 100.

The apparatus according to an example embodiment of the present disclosure may further include one or more enclosures 250.

The enclosure 250 may be connected or coupled to the rear edge portion (or the rear periphery portion) of the passive vibration member 100 to individually cover the one or more vibration generating apparatuses 200. For example, the enclosure 250 may be connected or coupled to the rear surface 100*a* of the passive vibration member 100 by a coupling member 251. The enclosure 250 may configure a sealing space, which covers or surrounds the one or more vibration generating apparatuses 200, at the rear surface 100*a* of the passive vibration member 100. For example, the enclosure 250 may be a sealing member, a sealing cap, a sealing box, or a sound box, but embodiments of the present disclosure are not limited thereto. The sealing space may be an air gap, a vibration space, a sound space, or a sounding box, but embodiments of the present disclosure are not limited thereto.

The enclosure 250 may include one or more materials of a metal material and a nonmetal material (or a complex nonmetal material). For example, the enclosure 250 may include one or more materials of metal, plastic, and wood, but embodiments of the present disclosure are not limited thereto.

The enclosure 250 according to an example embodiment of the present disclosure may maintain a constant impedance component based on air acting on the passive vibration member 100 when the passive vibration member 100 or the vibration generating apparatus 200 vibrates. For example, air around the passive vibration member 100 may resist to a vibration of the passive vibration member 100 and may act as an impedance component having a resistance and a reactance component, which vary based on a frequency.

Accordingly, the enclosure 250 may configure a sealing space, which surrounds the one or more vibration generating apparatuses 200, at the rear surface 100*a* of the passive vibration member 100, and thus, may maintain a constant impedance component (or an air impedance or an elastic impedance) acting on the passive vibration member 100 with air, thereby enhancing a sound characteristic and/or a sound pressure level characteristic of a low-pitched sound band and the sound quality of a high-pitched sound band.

A vibration apparatus and an apparatus including the same according to one or more example embodiments of the present disclosure are described below.

A vibration apparatus according to one or more example embodiments of the present disclosure may include a vibration generating part including at least one or more vibration parts, a first cover member at a first surface of the vibration generating part, a second cover member at a second surface of the vibration generating part, the second surface of the vibration generating part being different from the first surface of the vibration generating part, and a signal cable including first and second signal lines connected to the at least one or more vibration parts. The first and second signal lines may be provided between the second cover member and the vibration generating part.

A vibration apparatus according to one or more example embodiments of the present disclosure may include a vibration generating part including at least one vibration part, a first cover member at a first surface of the vibration generating part, a second cover member at a second surface of the vibration generating part, the second surface being different from the first surface (e.g., the second surface being opposite to the first surface), and a signal cable including a first signal line and a second signal line. The first and second signal lines may be connected to the at least one vibration part and may be provided between the second cover member and the vibration generating part. In one or more examples, the first signal line may be connected to the at least one vibration part (or to a portion of the at least one vibration part), and the second signal line may be connected to the at least one vibration part (or to another portion of the at least one vibration part).

According to one or more example embodiments of the present disclosure, at least a portion of each or one of the first signal line and the second signal line may be disposed between the second cover member and the vibration generating part. The first signal line and the second signal line may be connected to the at least one vibration part between the second cover member and the vibration generating part (i.e., a location at which the first signal line and the second signal line are connected to the at least one vibration part may be between the second cover member and the vibration generating part).

According to one or more example embodiments of the present disclosure, each or one of the at least one or more vibration parts may include a vibration layer including a piezoelectric material, a first electrode layer at a first surface of the vibration layer, and a second electrode layer at a second surface of the vibration layer, the second surface of the vibration layer being different from the first surface of the vibration layer. For example, the vibration layer may be disposed between the first electrode layer and the second electrode layer. Each or one of the at least one or more vibration parts may further include an auxiliary electrode layer connected to the first electrode layer. The auxiliary electrode layer may be disposed at the second surface of the vibration layer and/or in a same layer as the second electrode layer.

According to one or more example embodiments of the present disclosure, each or one of the at least one or more vibration parts may further include an auxiliary electrode layer being connected to the first electrode layer and being provided at a same layer as the second electrode layer. For example, each or one of the at least one or more vibration parts may further include an auxiliary electrode layer connected to the first electrode layer at a same layer as the second electrode layer.

According to one or more example embodiments of the present disclosure, the auxiliary electrode layer may be provided at the second surface of the vibration layer.

According to one or more example embodiments of the present disclosure, the second electrode layer may be spaced apart from the auxiliary electrode layer and/or isolated from the auxiliary electrode layer.

According to one or more example embodiments of the present disclosure, the auxiliary electrode layer may be connected to the first electrode layer by or via or through a first contact hole at or in the vibration layer. Alternatively or additionally, the auxiliary electrode layer may be connected with/to the first electrode layer by extending on (or along) a lateral or third surface of the vibration layer. The lateral or third surface may be a surface connecting the first and second surfaces of the vibration layer.

According to one or more example embodiments of the present disclosure, the first signal line may be connected to the auxiliary electrode layer, and the second signal line may be connected to the second electrode layer.

According to one or more example embodiments of the present disclosure, the at least one or more vibration parts may include a first vibration part on the first cover member, a second vibration part on the first vibration part, and a first connection member between the first vibration part and the second vibration part.

According to one or more example embodiments of the present disclosure, the first connection member may include a conductive material.

According to one or more example embodiments of the present disclosure, each of the first vibration part and the second vibration part may include a vibration layer including a piezoelectric material, a first electrode layer at a first surface of the vibration layer, and a second electrode layer at a second surface of the vibration layer, the second surface of the vibration layer being different from the first surface of the vibration layer.

According to one or more example embodiments of the present disclosure, the second vibration part may further include a first auxiliary electrode layer connected to the first electrode layer in the second vibration part. The first auxiliary electrode layer may be provided at a same layer as the second electrode layer in the second vibration part.

According to one or more example embodiments of the present disclosure, the first auxiliary electrode layer and the first electrode layer in the second vibration part may be connected to each other by or via or through a first contact hole at or in the vibration layer of the second vibration part. Alternatively or additionally, the first auxiliary electrode layer may be connected with/to the first electrode layer of the second vibration part by extending on (or along) a lateral or third surface of the vibration layer. The lateral or third surface may be a surface connecting the first and second surfaces of the vibration layer.

According to one or more example embodiments of the present disclosure, the signal cable may further include a third signal line connected to the first vibration part.

According to one or more example embodiments of the present disclosure, the second vibration part may further include: a first auxiliary electrode layer being spaced and/or isolated apart from the second electrode layer of the second vibration part, the first auxiliary electrode layer provided at a same layer as the second electrode layer of the second vibration part; and a second auxiliary electrode layer being spaced apart and/or isolated from the first electrode layer of the second vibration part, the second auxiliary electrode layer provided at a same layer as the first electrode layer of the second vibration part.

According to one or more example embodiments of the present disclosure, the second vibration part may include a first auxiliary electrode layer connected to the first electrode layer of the second vibration part (e.g., via or through a first contact hole in the vibration layer of the second vibration part) and being disposed in a same layer as the second electrode layer of the second vibration part (i.e., at the second surface of the vibration layer); and/or a second auxiliary electrode layer connected to the second electrode layer of the second vibration part (e.g., via or through a second contact hole in the vibration layer of the second vibration part) and being disposed in a same layer as the first electrode layer of the second vibration part (i.e., at the first surface of the vibration layer).

According to one or more example embodiments of the present disclosure, the first auxiliary electrode layer may be connected to the first electrode layer of the second vibration part by or via or through a first contact hole at one portion of the vibration layer, and the second auxiliary electrode layer may be connected to the second electrode layer of the second vibration part by or via or through a second contact hole at another portion of the vibration layer. Alternatively or additionally, the first auxiliary electrode layer may be connected with/to the first electrode layer by extending on (or along) a lateral or third surface of the vibration layer, and/or the second auxiliary electrode layer may be connected with/to the second electrode layer by extending on (or along) a lateral or fourth surface of the vibration layer. The lateral or third surface may be a surface connecting the first and second surfaces of the vibration layer.

According to one or more example embodiments of the present disclosure, the first vibration part may include a third auxiliary electrode layer connected to the first electrode layer of the first vibration part (e.g., via or through a third contact hole in the vibration layer of the first vibration part) and being disposed in a same layer as the second electrode layer of the first vibration part (i.e., at the second surface of the vibration layer).

According to one or more example embodiments of the present disclosure, the first vibration part may further include a third auxiliary electrode layer of the first vibration part being spaced and/or isolated apart from the second electrode layer of the first vibration part. The third auxiliary electrode layer may be provided at a same layer as the second electrode layer of the first vibration part.

According to one or more example embodiments of the present disclosure, the third auxiliary electrode layer may be connected to the first electrode layer of the first vibration part by or via or through a third contact hole at or in the vibration layer of the first vibration part. Alternatively or additionally, the third auxiliary electrode layer may be connected to the first electrode layer of the first vibration part by extending on (or along) a lateral or third surface of the vibration layer of the first vibration part. The lateral or third surface may be a surface connecting the first and second surfaces of the vibration layer.

According to one or more example embodiments of the present disclosure, the vibration apparatus may further include a second connection member overlapping the second auxiliary electrode layer and the third auxiliary electrode layer. The second connection member may be provided at a same layer as the first connection member. The second connection member may be disposed between the second auxiliary electrode layer and the third auxiliary electrode layer and/or disposed in or at a same layer as the first connection member and/or isolated from the first connection member and/or spaced apart from the first connection member.

According to one or more example embodiments of the present disclosure, the first electrode layer of the first vibration part may be electrically connected to the second electrode layer of the second vibration part by the second auxiliary electrode layer, the second connection member, and the third auxiliary electrode layer.

According to one or more example embodiments of the present disclosure, the auxiliary electrode layer may extend on, extend along, or surround a lateral surface of the vibration layer and may be connected to the first electrode layer. The lateral surface may be sometimes referred to as a third surface of the vibration layer connecting the first and second surfaces of the vibration layer.

According to one or more example embodiments of the present disclosure, the first signal line may be connected to the first electrode layer by the auxiliary electrode layer, and the second signal line may be connected to (e.g., directly connected to and/or in contact with) the second electrode layer.

According to one or more example embodiments of the present disclosure, the first auxiliary electrode layer may extend along one portion of the vibration layer in the second vibration part and may be connected to the first electrode layer of the second vibration part.

According to one or more example embodiments of the present disclosure, the second vibration part may include: a first auxiliary electrode layer connected to the first electrode layer of the second vibration part, the first auxiliary electrode layer extending along one portion of the vibration layer, the first auxiliary electrode layer provided at a same layer as the second electrode layer of the second vibration part; and a second auxiliary electrode layer connected to the second electrode layer of the second vibration part, the second auxiliary electrode layer extending along another portion of the vibration layer facing the one portion of the vibration layer, the second auxiliary electrode layer provided at a same layer as the first electrode layer of the second vibration part.

According to one or more example embodiments of the present disclosure, the first vibration part may further include a third auxiliary electrode layer connected to the first electrode layer of the first vibration part, the third auxiliary electrode layer overlapping the second auxiliary electrode layer and extending along the another portion of the vibration layer, the third auxiliary electrode layer provided at a same layer as the second electrode layer of the first vibration part.

According to one or more example embodiments of the present disclosure, the vibration apparatus may further include a second connection member overlapping the second auxiliary electrode layer and the third auxiliary electrode layer. The second connection member may be provided at a same layer as the first connection member.

According to one or more example embodiments of the present disclosure, the first electrode layer of the first vibration part may be connected to the second electrode layer of the second vibration part by the second auxiliary electrode layer, the second connection member, and the third auxiliary electrode layer.

According to one or more example embodiments of the present disclosure, the second connection member may include a conductive material.

A vibration apparatus according to one or more embodiments of the present disclosure includes a first cover member; a first vibration part on the first cover member; a second vibration part on the first vibration part; a second cover member on the second vibration part; and a signal cable connected with the first vibration part and the second vibration part, including first and second signal lines between the second cover member and the second vibration part and a third signal line between the first cover member and the first vibration part.

According to one or more embodiments of the present disclosure, each of the first vibration part and the second vibration part may include a vibration layer including a piezoelectric material, a first electrode layer at a first surface of the vibration layer, and a second electrode layer at a second surface differing from the first surface of the vibration layer.

An apparatus according to one or more example embodiments of the present disclosure may comprise a passive vibration member (e.g., a vibration plate) and a vibration generating apparatus coupled to or connected to the passive vibration member and configured to vibrate the passive vibration member, the vibration generating apparatus including or being a vibration apparatus according to any one of the aspects and embodiments described herein. The vibration apparatus may include a vibration generating part including at least one or more vibration parts, a first cover member at a first surface of the vibration generating part, a second cover member at a second surface of the vibration generating part, the second surface of the vibration generating part being different from the first surface of the vibration generating part, and a signal cable including first and second signal lines connected to the at least one or more vibration parts. The first and second signal lines may be provided between the second cover member and the vibration generating part.

According to one or more example embodiments of the present disclosure, the apparatus may further include an enclosure disposed at a rear surface of the passive vibration member.

According to one or more example embodiments of the present disclosure, the enclosure may surround the vibration generating apparatus (or the vibration apparatus).

According to one or more example embodiments of the present disclosure, the vibration generating apparatus, in particular the vibration apparatus, may be disposed at or coupled to a rear surface of the passive vibration member. The vibration generating apparatus, in particular the vibration apparatus, may be coupled to the rear surface of the passive vibration member by a connection member.

According to one or more example embodiments of the present disclosure, the apparatus may further include a supporting member coupled to the passive vibration member, in particular to a/the rear surface of the passive vibration member, by at least one coupling member to define a gap space between the passive vibration member and the supporting member. In the gap space, the vibration generating apparatus (e.g., surrounded by the enclosure) may be arranged.

According to one or more example embodiments of the present disclosure, the passive vibration member may include one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, metal, plastic, paper, fiber, cloth, leather, wood, rubber, glass, carbon, and mirror.

According to one or more example embodiments of the present disclosure, a vibration apparatus and an apparatus including the same may be provided where a structure and a manufacturing process may be simplified.

According to one or more example embodiments of the present disclosure, a vibration apparatus and an apparatus including the same may be provided where a reduction in sound characteristic may be minimized despite using an electrode having a high resistivity.

According to one or more example embodiments of the present disclosure, a thickness of a vibration apparatus may decrease, and thus, a weight may be reduced, thereby implementing a vibration apparatus which is lightweight.

According to one or more example embodiments of the present disclosure, a defect such as a crack may be prevented from occurring in a vibration apparatus, and thus, a yield rate may be enhanced, thereby implementing process optimization by decreasing energy utilized in manufacturing.

According to one or more example embodiments of the present disclosure, because a manufacturing process is simplified, energy used in manufacturing may be reduced, and thus, process optimization may be implemented.

A vibration apparatus according to one or more example embodiments of the present disclosure may be applied to or included in a vibration generating apparatus and/or a sound generating apparatus provided in an apparatus. The vibration apparatus and apparatus comprising the same according to one or more example embodiments of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. In addition, the vibration apparatus according to some example embodiments of the present disclosure may be applied to or included in organic light-emitting lighting apparatuses or inorganic light-emitting lighting apparatuses. When the vibration apparatus of one or more example embodiments of the present disclosure is applied to or included in lighting apparatuses, the vibration apparatus may act as a lighting device and a speaker. In addition, when the vibration apparatus according to some example embodiments of the present disclosure is applied to or included in a mobile device, or the like, the vibration apparatus may be one or more of a speaker, a receiver, and a haptic device, but embodiments of the present disclosure are not limited thereto.

It will be apparent to those skilled in the art that various modifications and variations can be made in the present disclosure without departing from the technical idea or scope of the present disclosure. Thus, it is intended that the present disclosure covers the modifications and variations of this disclosure provided they come within the scope of the appended claims and their equivalents.

What is claimed is:

1. A vibration apparatus, comprising:
- a vibration generating part including at least one or more vibration parts;
- a first cover member at a first surface of the vibration generating part;
- a second cover member at a second surface of the vibration generating part, the second surface of the vibration generating part being different from the first surface of the vibration generating part; and
- a signal cable including a first signal line and a second signal line, the first and second signal lines connected to the at least one or more vibration parts, the first and second signal lines being provided between the second cover member and the vibration generating part,
- wherein each of the at least one or more vibration parts comprises:
- a vibration layer including a piezoelectric material;
- a first electrode layer at a first surface of the vibration layer; and
- a second electrode layer at a second surface of the vibration layer, the second surface of the vibration layer being different from the first surface of the vibration layer, and
- wherein each of the at least one or more vibration parts comprises an auxiliary electrode layer being connected to the first electrode layer and being provided at a same layer as the second electrode layer.

2. The vibration apparatus of claim 1, wherein the auxiliary electrode layer is provided at the second surface of the vibration layer.

3. The vibration apparatus of claim 1, wherein the second electrode layer is spaced apart from the auxiliary electrode layer.

4. The vibration apparatus of claim 1, wherein the auxiliary electrode layer is connected to the first electrode layer via a first contact hole at the vibration layer.

5. The vibration apparatus of claim 1, wherein the first signal line is connected to the auxiliary electrode layer, and
- wherein the second signal line is connected to the second electrode layer.

6. The vibration apparatus of claim 1, wherein the auxiliary electrode layer surrounds a lateral surface of the vibration layer and is connected to the first electrode layer.

7. The vibration apparatus of claim 6, wherein the first signal line is connected to the first electrode layer by the auxiliary electrode layer, and the second signal line is connected to the second electrode layer.

8. An apparatus, comprising:
- a passive vibration member; and
- a vibration generating apparatus coupled to the passive vibration member to vibrate the passive vibration member,
- wherein the vibration generating apparatus comprises the vibration apparatus of claim 1.

9. The apparatus of claim 8, further comprising an enclosure disposed at a rear surface of the passive vibration member.

10. The apparatus of claim 9, wherein the enclosure surrounds the vibration generating apparatus.

11. The apparatus of claim 8, further comprising a supporting member coupled to the passive vibration member by a coupling member such that a gap space is defined between the passive vibration member and the supporting member, the vibration generating apparatus being disposed in the gap space.

12. The apparatus of claim 8, wherein the passive vibration member comprises one or more of a display panel including a pixel configured to display an image, a screen panel on which an image is to be projected from a display apparatus, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, metal, plastic, paper, fiber, cloth, leather, wood, rubber, glass, carbon, and mirror.

13. A vibration apparatus, comprising:
- a vibration generating part including at least one or more vibration parts;
- a first cover member at a first surface of the vibration generating part;
- a second cover member at a second surface of the vibration generating part, the second surface of the vibration generating part being different from the first surface of the vibration generating part; and
- a signal cable including a first signal line and a second signal line, the first and second signal lines connected to the at least one or more vibration parts, the first and second signal lines being provided between the second cover member and the vibration generating part,
- wherein the at least one or more vibration parts comprise:
- a first vibration part on the first cover member;
- a second vibration part on the first vibration part; and
- a first connection member between the first vibration part and the second vibration part,
- wherein each of the first vibration part and the second vibration part comprises:
- a vibration layer including a piezoelectric material;
- a first electrode layer at a first surface of the vibration layer; and
- a second electrode layer at a second surface of the vibration layer, the second surface of the vibration layer being different from the first surface of the vibration layer,
- wherein the second vibration part further comprises a first auxiliary electrode layer connected to the first electrode layer in the second vibration part, and
- wherein the first auxiliary electrode layer is provided at a same layer as the second electrode layer in the second vibration part.

14. The vibration apparatus of claim 13, wherein the first connection member comprises a conductive material.

15. The vibration apparatus of claim 13, wherein the first auxiliary electrode layer and the first electrode layer in the second vibration part are connected to each other via a first contact hole at the vibration layer of the second vibration part.

16. The vibration apparatus of claim 13, wherein the signal cable further comprises a third signal line connected to the first vibration part.

17. The vibration apparatus of claim 13, wherein the second vibration part further comprises:

a second auxiliary electrode layer being spaced apart from the first electrode layer of the second vibration part, the second auxiliary electrode layer provided at a same layer as the first electrode layer of the second vibration part, and wherein the first auxiliary electrode layer is spaced apart from the second electrode layer of the second vibration part.

18. The vibration apparatus of claim 17, wherein the first auxiliary electrode layer is connected to the first electrode layer of the second vibration part by a first contact hole at one portion of the vibration layer, and wherein the second auxiliary electrode layer is connected to the second electrode layer of the second vibration part by a second contact hole at another portion of the vibration layer.

19. The vibration apparatus of claim 18, wherein the first vibration part further comprises a third auxiliary electrode layer being spaced apart from the second electrode layer of the first vibration part, and wherein the third auxiliary electrode layer is provided at a same layer as the second electrode layer of the first vibration part.

20. The vibration apparatus of claim 19, wherein the third auxiliary electrode layer is connected to the first electrode layer of the first vibration part by a third contact hole at the vibration layer of the first vibration part.

21. The vibration apparatus of claim 20, further comprising a second connection member overlapping the second auxiliary electrode layer and the third auxiliary electrode layer, wherein the second connection member is provided at a same layer as the first connection member.

22. The vibration apparatus of claim 21, wherein the first electrode layer of the first vibration part is electrically connected to the second electrode layer of the second vibration part by the second auxiliary electrode layer, the second connection member, and the third auxiliary electrode layer.

23. The vibration apparatus of claim 13, wherein the first auxiliary electrode layer extends along one portion of the vibration layer in the second vibration part and is connected to the first electrode layer of the second vibration part.

24. The vibration apparatus of claim 13, wherein the second vibration part further comprises:

a second auxiliary electrode layer connected to the second electrode layer of the second vibration part, the second auxiliary electrode layer extending along another portion of the vibration layer facing one portion of the vibration layer, and the second auxiliary electrode layer provided at a same layer as the first electrode layer of the second vibration part, and wherein the first auxiliary electrode layer is connected to the first electrode layer of the second vibration part, the first auxiliary electrode layer extending along the one portion of the vibration layer.

25. The vibration apparatus of claim 24, wherein the first vibration part further comprises a third auxiliary electrode layer connected to the first electrode layer of the first vibration part, the third auxiliary electrode layer overlapping the second auxiliary electrode layer and extending along the another portion of the vibration layer, and the third auxiliary electrode layer provided at a same layer as the second electrode layer of the first vibration part.

26. The vibration apparatus of claim 25, further comprising a second connection member overlapping the second auxiliary electrode layer and the third auxiliary electrode layer, wherein the second connection member is provided at a same layer as the first connection member.

27. The vibration apparatus of claim 26, wherein the first electrode layer of the first vibration part is connected to the second electrode layer of the second vibration part by the second auxiliary electrode layer, the second connection member, and the third auxiliary electrode layer.

28. The vibration apparatus of claim 26, wherein the second connection member comprises a conductive material.

29. The vibration apparatus of claim 26, wherein the second connection member comprises a same material as the first connection member.

* * * * *